US011423332B2

(12) United States Patent
Jha et al.

(10) Patent No.: US 11,423,332 B2
(45) Date of Patent: Aug. 23, 2022

(54) DISTRIBUTED MACHINE LEARNING IN AN INFORMATION CENTRIC NETWORK

(71) Applicant: Intel Corporation, Santa Clara, CA (US)

(72) Inventors: Satish Chandra Jha, Hillsboro, OR (US); S M Iftekharul Alam, Hillsboro, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 16/586,593

(22) Filed: Sep. 27, 2019

(65) Prior Publication Data

US 2020/0027022 A1 Jan. 23, 2020

(51) Int. Cl.
*G06N 20/00* (2019.01)
*H04L 67/00* (2022.01)

(52) U.S. Cl.
CPC ............. *G06N 20/00* (2019.01); *H04L 67/34* (2013.01)

(58) Field of Classification Search
CPC .......... G06N 20/00; G06N 3/08; H04L 67/34; H04L 67/327; H04L 67/10
See application file for complete search history.

(56) References Cited

U.S. PATENT DOCUMENTS

| 10,075,401 | B2 * | 9/2018 | Mosko ..................... H04L 51/14 |
| 10,461,421 | B1 * | 10/2019 | Tran ........................ G06N 20/10 |
| 10,469,379 | B2 * | 11/2019 | Bosch ..................... H04L 67/327 |
| 10,911,207 | B1 * | 2/2021 | Compagno ............. H04L 1/189 |
| 2009/0191867 | A1 * | 7/2009 | Siegel ................. H04L 65/1073 455/435.1 |
| 2014/0351929 | A1 * | 11/2014 | Mahadevan ........ H04L 63/1408 726/22 |
| 2016/0119194 | A1 * | 4/2016 | Valencia Lopez .......................... H04L 67/2804 709/223 |
| 2016/0191257 | A1 * | 6/2016 | Garcia-Luna-Aceves .................... H04L 67/327 370/390 |
| 2016/0234333 | A1 * | 8/2016 | Yeh .......................... H04L 47/27 |
| 2016/0234736 | A1 * | 8/2016 | Kubota .................... H04L 12/18 |
| 2017/0034055 | A1 * | 2/2017 | Ravindran ............ H04L 45/306 |
| 2018/0013666 | A1 * | 1/2018 | Wood ...................... H04L 45/54 |
| 2018/0018713 | A1 * | 1/2018 | Burleigh ............. G06F 16/2453 |
| 2019/0073419 | A1 * | 3/2019 | Dong ..................... G06F 16/957 |
| 2019/0182356 | A1 * | 6/2019 | Ko ........................... H04W 4/20 |
| 2019/0327169 | A1 * | 10/2019 | Alam .................... H04L 45/306 |

(Continued)

*Primary Examiner* — Javier O Guzman
(74) *Attorney, Agent, or Firm* — Schwegman Lundberg & Woessner, P.A.

(57) ABSTRACT

Systems and techniques for distributed machine learning (DML) in an information centric network (ICN) are described herein. Finite message exchanges, such as those used in many DML exercises, may be efficiently implemented by treating certain data packets as interest packets to reduce overall network overhead when performing the finite message exchange. Further, network efficiency in DML may be improved achieved by using local coordinating nodes to manage devices participating in a distributed machine learning exercise. Additionally, modifying a round of DML training to accommodate available participant devices, such as by using a group quality of service metric to select the devices, or extending the round execution parameters to include additional devices, may have an impact on DML performance.

24 Claims, 14 Drawing Sheets

(56) References Cited

U.S. PATENT DOCUMENTS

2020/0036814 A1* 1/2020 Muscariello ............ H04L 67/28
2020/0288374 A1* 9/2020 Henry ................... H04W 40/32

* cited by examiner ium in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is routed back through the network to the source by following the traces of the interest left in the network devices.

DISTRIBUTED MACHINE LEARNING IN AN INFORMATION CENTRIC NETWORK

TECHNICAL FIELD

Embodiments described herein generally relate to a distributed artificial intelligence and more specifically to distributed machine learning in an information centric network (ICN).

BACKGROUND

With the proliferation of mobile edge nodes (e.g., smartphones, Internet of things (IoT), etc.) equipped with compute, communication, and storage capabilities, data generated by these nodes is increasingly spread across large geographical areas. Typical centralized machine learning techniques involve uploading data to central cloud for training. Moving large volumes of geographically dispersed data from the edge to the cloud, however, is prohibitively difficult, if not impossible, due to high communication overhead. Furthermore, users may have privacy concerns when sharing their data across these vast distances. Distributed Machine Learning (DML) attempts to overcome these issues by using local data (e.g., data generated by the user's device) to train an on-device model and then sharing model parameters or gradients (e.g., results of the training update with the local data) with a central aggregator. Thus, the user's data remains with the user and the transmission used to update the model is merely of changes or adjustments to the model rather than the raw data. The updates may be aggregated over many submissions, enabling the user device to download the updated model from the server. An example of a DML implementation is Federated Learning (FL).

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is routed back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
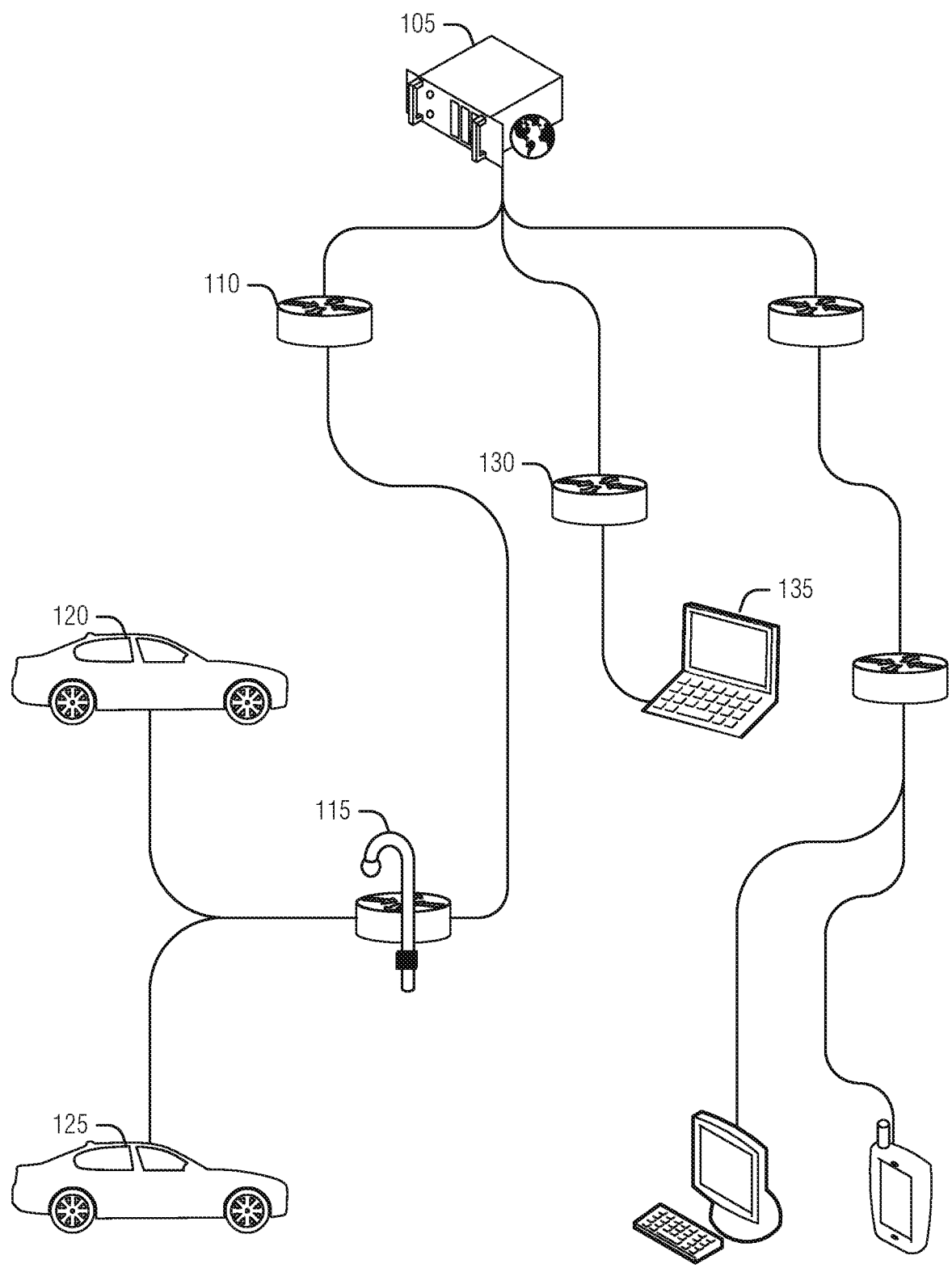
FIG. 1 illustrates an example of an ICN and system for distributed machine learning, according to an embodiment.

DML generally involves substantial message exchanges among a global aggregator (GA) and devices. These messages exchanges include discovering, recruiting, or selecting participant devices, download the model or model parameters that will be trained with local data, uploading model changes due to the training, and aggregating model updates among other things. Generally, message interactions between nodes involve forwarding messages (e.g., data, requests, responses, parameters) over multiple network elements (e.g., multi-hops including wireless access points (APs)). Typically, each of these messages are exchanged as a separate unicast packet between every device and GA in existing connection-based networks, such as transmission control protocol over internet protocol (TCP/IP) based networks. This may create huge communication overhead to the network. Replacing TCP/IP with a vanilla Information-Centric Networking (ICN) layer may not improve the network overhead over that of a connection-based network. However, ICN may be made more efficient.

Assume that many participants are in the same locality (e.g., geographically close to each other). This generally means that unicast messages (e.g., to deliver training parameters, the model, etc.) to these participants over multi-hop routes probably share data and a common path over the network. This reveals an opportunity to optimize the underlying networking layer for the DML workload. This optimization starts with an efficient network layer for message forwarding and message content optimization that avoids redundant messages, or redundant content of messages, over the shared path. The optimization may also include techniques to ensure that the training is performed in a secure environment that also ensures the security and privacy of training data.

These optimization goals may be met via ICN messages designed to enable the GA to discover or select capable edge participants as judged by model training requirements, such as data quality, computing capability, security hardware or software, etc. Further, the ICN pending interest table (PIT) may be used differently from its traditional role by adding PIT entries for these messages to avoid unnecessary forwarding of redundant contents between GA and edge participants. Additionally, a local trusted node (e.g., road side units (RSUs) that may be part of a vehicular communication network) may act as a local coordinator (LC) to assist GA in DML operations. In an example, LCs may employ a geo-area-aware selection technique, LC-assisted discovery of edge participants, or procedure to address mobility when a participant moves from one LC to another during a round of training. Also, a group quality of service (QoS)-aware participant selection technique may be used to ensure training update reporting to LC and GA within a latency bound. This all may be supplemented with a secure procedure for downloading the model, an algorithm or software to training the model, or other training data from a secure entity to ensure the security or privacy of DML training data produced by the participating devices. Applying the systems and techniques herein enables DML over multi-hop ICN networks while avoiding redundant message transmissions. Additional details and examples are provided below.

FIG. 1 illustrates an example of an ICN and system for distributed machine learning, according to an embodiment. As illustrated, a GA 105 is connected to one or more participant devices (e.g., downstream nodes, represented here as device 120, device 125, and device 135) via ICN routers (such as ICN router 110 and ICN router 130) to form an ICN network.

The GA 105 directs DML activities with respect to an artificial intelligence model, generally referred to herein as simply a model. The GA 105 is also responsible for aggregating model updates produced by participant devices 120, 125, and 130 to produce an updated model at the end of a DML round of training.

An LC 115 may be employed by the GA 105 to coordinate participant devices close to the LC 115. Thus, as illustrated here, the LC 115 is an RSU servicing vehicles that are acting as participant devices 120 and 125. In an example, the LC 115 may participate in selecting participant devices for a DML round. In an example, the LC 115 may participate in routing ICN messages between the participant devices 120 and 125 and the GA 105. In an example, the LC 115 may aggregate model updates from the participant devices 120 and 125 before transmitting to the GA 105. In an example, the LC 115 may act as a model training algorithm store from which the participant devices 120 and 125 may obtain a model training algorithm for a round of DML. Generally, the LC 115 provides a coordination close to the participant devices 120 and 125 to relieve network congestion.

FIGS. 2-11 illustrate various additional aspects of the GA 105, LC 115, and participant device (e.g., participant device 120, 125, and 130) roles and messages exchanges when implementing DML. The following examples with respect to FIG. 1, however, will focus on the operation of the ICN router 110 with respect to a round of DML. Such a focus clarifies the modifications made to ICN in order to efficiently implement DML in an ICN network. In this context, the ICN router 110 includes upstream and downstream network ports, machine readable media to maintain a local cache and a PIT, as well as processing circuitry to implement operations performed by the ICN router 110.

The ICN router 110 is configured—for example the processing circuitry is hardwired or executing instructions—to receive a participant solicitation interest packet. This interest packet is originally generated by the GA 105 and received on the upstream network interface of the ICN router 110. The solicitation interest packet includes a name that identifies the solicitation interest packet as a DML participant solicitation. Thus, upon mere inspection of the name, the ICN router 110, the LC 115, or the participant device 120 are aware of the purpose of this interest. Thus, for example, the ICN router 110 may consult its forwarding interest base (FIB) to determine which of possibly several downstream network interfaces to forward the interest in order to reach potential participant devices such as participant device 120 or 125.

In an example, the name of the interest packet includes a DML round identification (ID) for the round of DML. Identifying which DML round this interest pertains in the name may provide some convenience for caching the interest and data packets that respond to the interest packet, as well as removing these items from the local cache or PIT table upon termination of the DML round. In an example, the participant solicitation interest packet name includes a DML task ID, which, again may be helpful for cache and record keeping activities on the ICN router 110.

In an example, the interest packet name includes an aggregator ID, such as the LC 115. Including the aggregator ID in the name may provide some helpful stemming filters based on, for example, which of several aggregators are responding with updated models in a DML round. In general, the content and order of that content in the name may be adjusted to address different issues regarding searching for forward routes in the FIB, or cache decisions in the local cache. Often, the ICN router 110 will have relatively simple mechanisms to differentiate between different named data. These mechanisms usually assume that the most significant information in a name is located to the front, and less significant located to the end of the name. Thus, name prefixes are generally the most significant aspect when ascertaining whether data is related when, for example, the data is not identically named.

In an example, the participant solicitation interest packet includes a set of parameters to participate in a round of DML. These parameters may take the place of some elements noted above if they are not included in the name, such as the DML round ID, aggregator ID, etc. Generally, these parameters inform the LC 115 or the participant node 120 of the requirements or operating criteria to participate in the DML round. In an example, the parameters include computation requirements, such as a minimum accuracy, type of hardware, etc. In an example, the parameters specify a maximum age of information (AoI) that the participant node 120 may use to for training in the DML round.

In an example, the parameters specify a model training algorithm to use for the DML round. This specification may name a particular model training algorithm, or it may specify attributes of the model training algorithm such that several available model training algorithms may be used by the participant node 120. In an example, the specification of the model training algorithm may include reputation score for the algorithms. In an example, the specification may include data stores from which the algorithms may be obtained.

In an example, the parameters specify reporting requirements, such as a format for model updates, metrics about the model update, etc. In an example, the parameters include DML round timing, such as when participation solicitation closes, when participant selection occurs, when model updates are expected, etc.

In an example, the set of parameters include security requirements. In an example, the security requirements specify hardware, such as a trusted execution environment (TEE), in which data must be stored, or in which a model training algorithm must be stored or executed. In an example, the security requirements specify a type or level of encryption to apply to the data used for DML training, the model training algorithm, or produced model updates.

The ICN router 110 is also configured to create a first PIT entry for the participant solicitation interest packet. As is usual in an ICN network, the PIT entry provides a path back to the GA 105 for any responses to the participant solicitation interest packet. However, as several responses may be expected, instead of removing this PIT entry upon the first response, the PIT entry is maintained until the expiration of a timer. In an example, the duration of the timer is specified in the solicitation interest packet, either as part of the name or as a parameter (e.g., a Round End time value).

The ICN router 110 is configured to receive a first data packet (e.g., from the participant device 120 or the LC 115) in response to the solicitation interest packet. Here, the response indicates that the downstream node 120 will participate in the round of DML specified by the solicitation interest packet. In an example, the first data packet has name that adds a participant ID to the name of the first interest packet. As noted above, this name slightly varies from the interest packet, but in a portion that may not be used for the back-track matching to route the data packet back to the GA 105.

The ICN router 120 is configured to add a second PIT entry for the first data packet in response to receiving the data packet. Thus, the first data packet is simultaneously treated as a data packet and an interest packet. Such an arrangement may reduce the number of interest packets needed for effective ICN communications in a protocol that uses a known request-response-response- . . . -response back-and-forth between nodes. In an example, the second PIT entry corresponds to the first PIT entry. Here, the correspondence may simply be a shared prefix. However, the correspondence may include a linking in meta-data of the PIT table or PIT table entries.

The ICN router 110 is configured to transmit the first data packet in accordance with the first PIT entry. This transmission involves using the first PIT entry to route the data packet through the correct upstream network interface to reach the GA 105.

The ICN router 110 is configured to receive a second data packet in response to the first data packet. Again, this exchange operates differently than most ICN exchanges because the second data packet responds to the first data packet rather than an interest packet. Here, the second data packet identifies a DML model for the downstream node. In an example, the identification of the DML is the model training algorithm to be implemented by the downstream node in the round of DML. If the participant node 120 already has the model training algorithm or will receive it from a secure model algorithm store as described below, then this exchange may not occur. However, this exchange assumes that the GA 105 is providing the model training algorithm—or a link, access, etc. to the model training algorithm—to the participant node 120.

In an example, the ICN router 110 is configured to create a third PIT entry for the second data packet upon receiving the second data packet. Again, the PIT entry being created for a data packet is atypical in an ICN but is efficient because a model update is expected in response to the second data packet. Thus, in an example, the ICN router 110 is configured to receive a third data packet that is a model update packet. The ICN router 110 may then transmit a representation of the third data packet in accordance with the third PIT entry. In an example, the representation of the third data packet is at least one of the third data packet or an aggregation of the data of the third data packet with other data packets from other downstream nodes. In this last scenario, the ICN router 110 is acting as an aggregator for the DML round.

The ICN router 110 is configured to transmit the second data packet in accordance with the second PIT entry. Thus, the ICN router provides the participant node 120 or the LC 115 with the model training data packet for use in the present round of DML.

These modifications to the ICN paradigm improve the efficiency of DML operations in an ICN. Using data packets as interest packets in a known back-and-forth protocol reduces unnecessary interest packet overhead in the network. In an example, the sequence of responses may be included in the first interest packet, enabling each ICN router 110 or 130 to establish PIT entries for a defined number, or name specified, data packets that are part of a chain of messages starting with the interest packet. In this case the chain may include both upstream and downstream data packets.

Figure 2:
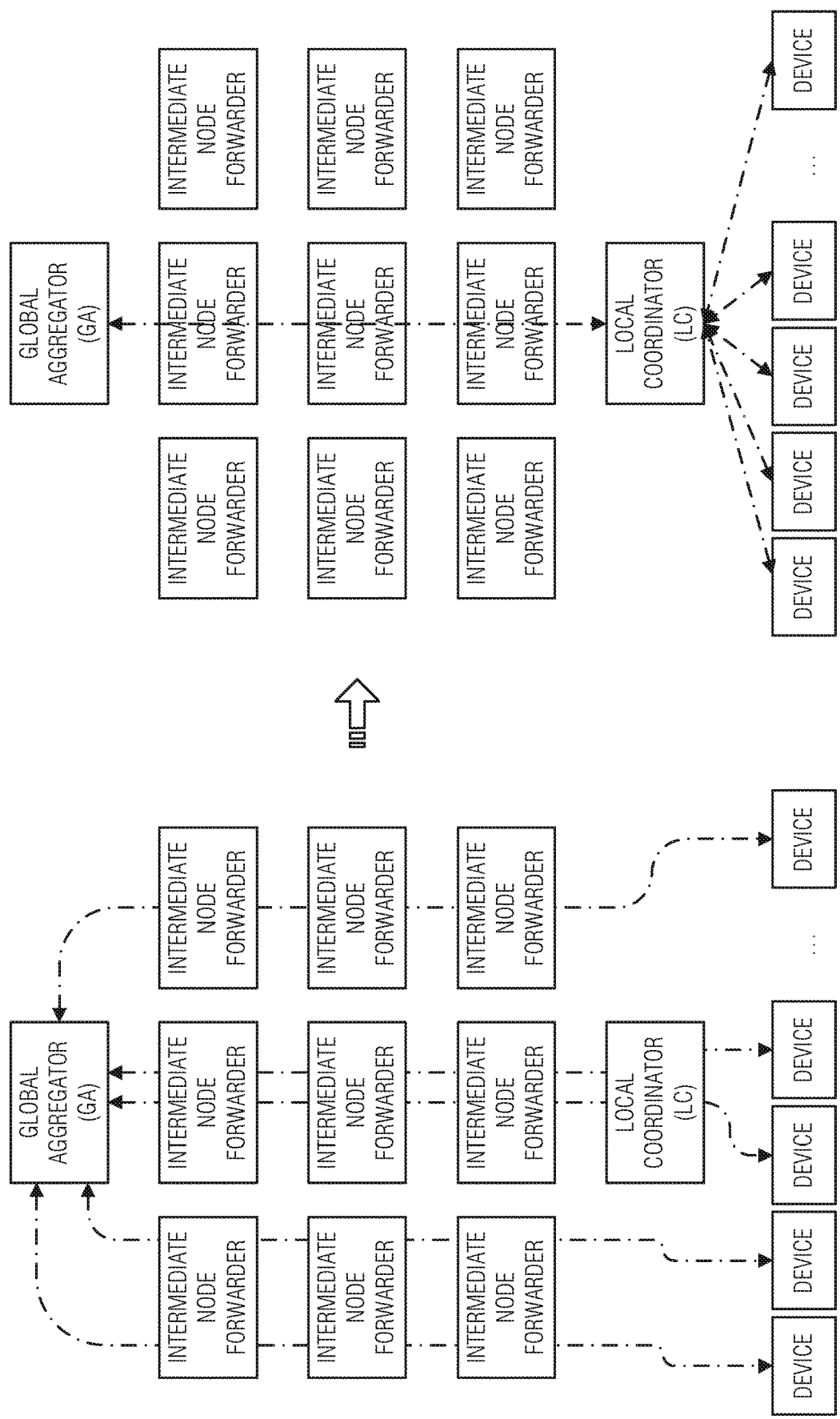
FIG. 2 illustrates differing communication pathways for distributed machine learning, according to an embodiment.

FIG. 2 illustrates differing communication pathways for distributed machine learning, according to an embodiment. Specifically, FIG. 2 illustrates an example of network communication overhead reduction during message exchanges for DML. The systems and techniques described herein enable DML over multi-hop ICN with reduced communication overhead. Two types of DML ICN frameworks are discussed: one where a GA exchanges messages directly with the participant devices; and another where the GA employs an LC to assist the GA in DML operations. In an example, the LC may also take the role of a model parameter aggregator (e.g., perform federated averaging of model update results from participants). This arrangement may be well suited for hierarchical FL.

Aspects of the ICN modifications to support DML may include ICN messages specifically to enable efficient DML over ICN. Here, these messages may be used to implement a discovery process to exchange information between the GA, a possible LC, and participant, or potential participant, nodes. Further, the messages provide the basis for a mechanism to select participants, a procedure to download models to selected participants, and a mechanism for reporting model updates (e.g., the results of the training at a participant node) from participants to the GA. This last mechanism may also include an early DML stop indication from GA to participants, causing participants still updating the model to cease, ostensibly because their output is no longer sought for this round of DML.

As naming is a fundamental aspect in ICN networks, the DML ICN messages employ naming convention specific to DML tasks. For example, the names may include DML round parameters in order to promote appropriate caching and use at ICN nodes between the GA and the participant nodes. In addition to naming conventions, the ICN network nodes may be modified to hold or route messages differently based on PIT entries. For example, a mechanism to add PIT entries upon reception of one or more of these messages may be used to add DML associated parameters as metadata in the PIT table to avoid unnecessary forwarding of DML content and reduce network traffic. Further, a mechanism to define expiry or removal of PIT entries based on parameters or values included in one or more of these messages may be employed to minimize forwarding of DML content or messages when the content or message is no longer relevant to a round of DML.

As noted above, an LC assisted DML mechanism may be used in which one or more LCs in each geographic area (Geo-Area) or proximity are selected, and the GA and LCs coordinate to handle DML message exchanges between GA and participants to reduce network overhead (as illustrated in the right side of FIG. 2). Further, the LC may participate or assist in discovery procedures of DML capabilities of participants in its proximity, participant selection, model distribution for local participants and model update uploading from local participants. In an example, the LC may assist in aggregating model updates from local participants and upload the locally aggregated model to GA. Further the LCs may implement participant handover to enable greater participant mobility.

In an example, because groups of participants are used, a group quality-of-service (QoS) may be used to determine which participants to use rather than QoS for each participant. The group QoS often enables greater device participation as the overall quality (e.g., timelines, compute capabilities, etc.) of the group are measured, allowing some less productive nodes to still contribute. In an example, a group QoS aware participant selection measure may be used to ensure training update reporting to the LC or the GA within a latency bound (e.g., within so many seconds) by a specified percent of total participants.

Figure 3:
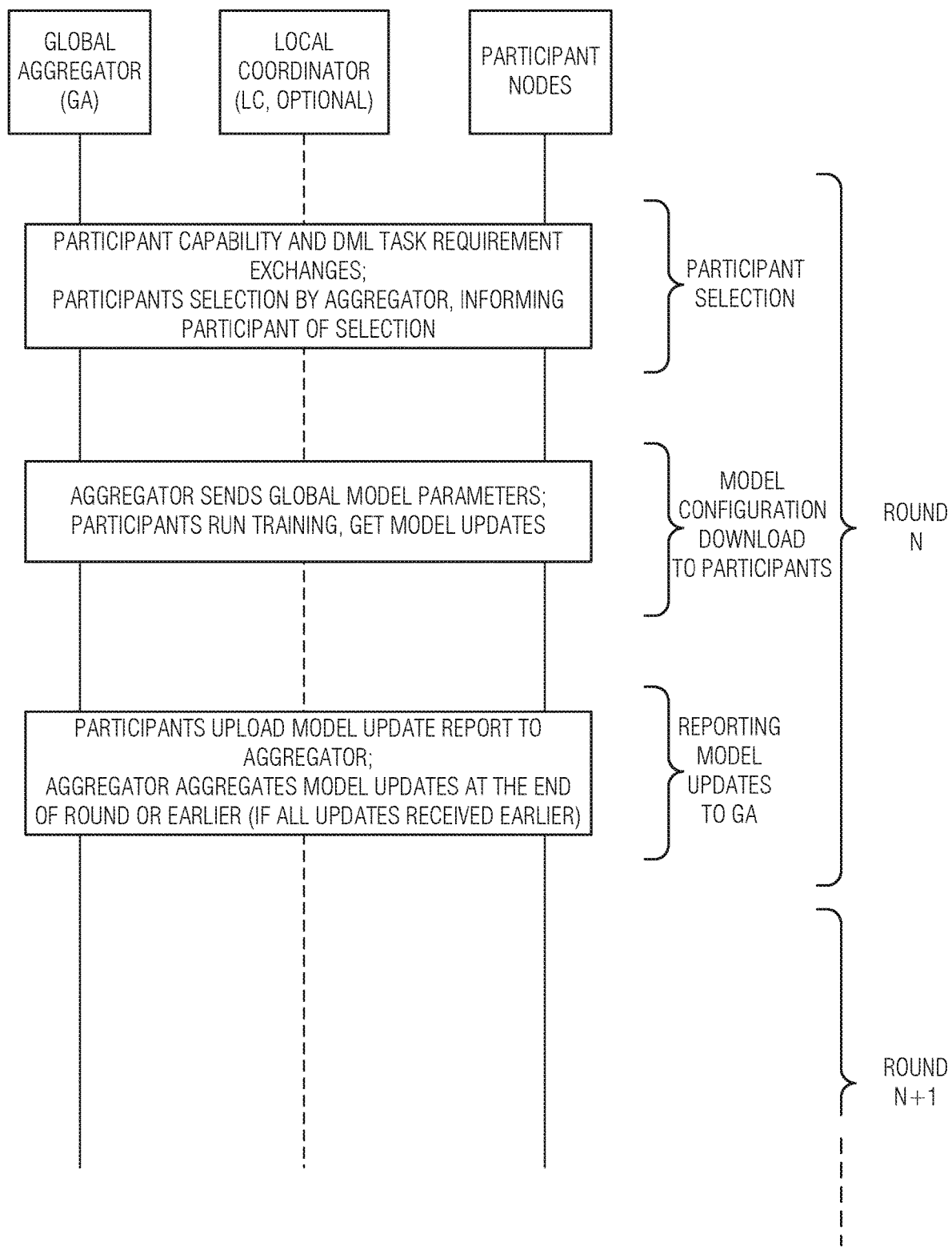
FIG. 3 illustrates operations in a distributed machine learning protocol, according to an embodiment.

FIG. 3 illustrates operations in a distributed machine learning protocol, according to an embodiment. Specifically, this is an example of synchronous DML, however, a similar set of actions are performed in asynchronous learning although the order or alignment of operations between entities may not be synchronized.

Some assumptions are made here, such as a central entity (e.g., a mobile edge computing (MEC) gateway, server, or cloud service) acting as central coordinating node (e.g., agent, distributor, aggregator, etc.), which is here termed GA. The GA organizes participant selection for training, operation of the DML model distribution, and receipt and integration of updated global model parameters—e.g., by aggregating model updates from participants. In DML, the neural network weights or other adjustments to the model that are calculated by participant devices are combined the global model by the GA, for example, using federated averaging. The GA may be arranged to then construct the global model and provide the global model to devices to you in inferencing operations.

As noted above, the DML training may be performed asynchronously or synchronously. Although the DML over ICN details described herein apply to asynchronous as well as synchronous DML training cases, many of the examples are presented using a synchronous training technique with synchronous rounds of DML model updates. Generally, the examples assume that the data used for training is stored at the participant devices, such as mobile phones, tablets, vehicles, home sensors, etc. Generally, because the training happens on the same device as the data, the data is not shared, protecting user privacy with respect to personal data, private data, behavior data, motion data, etc. Thus, these techniques are an example of bringing the code to the data, instead of the data to the code to address the issues of privacy, ownership, and locality of data.

In a typical DML, the GA may set up periodic or frequent rounds and, in each round, the GA selects a specific number of devices to participate in the DML training. Generally, the GA sends global model parameters to the selected participants. Participants run the specified or previously agreed upon DML training algorithm and upload the model updates to the GA. The GA then aggregates the model updates from the various participant nodes to update the global model. The updated global model then may be pushed to devices.

The following discussion considers two cases. In the first case, the GA exchanges messages directly with the participant devices. In the second case, an LC is used to assist the GA. For example, in vehicle to everything (V2X) use cases, there may be RSUs used as LCs. Similarly, in case of smart building (e.g., smart home, smart office, etc.), IoT gateways or the like may be used as LCs. In an example, hybrid use case, where only part of network has LCs, is contemplated.

Figure 4:
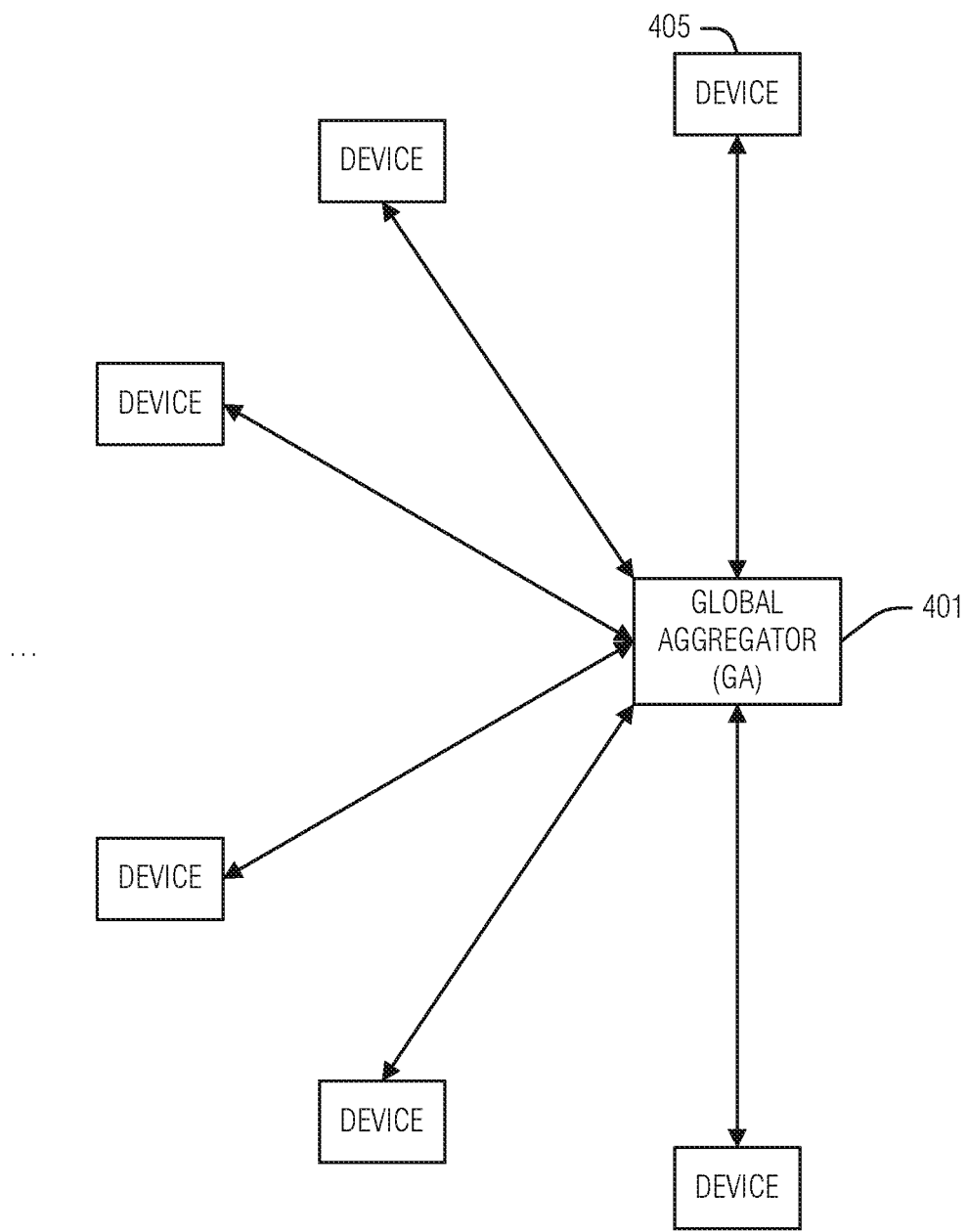
FIG. 4 illustrates an architecture for distributed machine learning without a local coordinator, according to an embodiment.

FIG. 4 illustrates an architecture for distributed machine learning without an LC, according to an embodiment. This high-level architecture for DML has no LC. Thus, to provide context for the following discussion, the GA 410 and participant devices (e.g., device 405) exchange messages directly.

Figure 5:
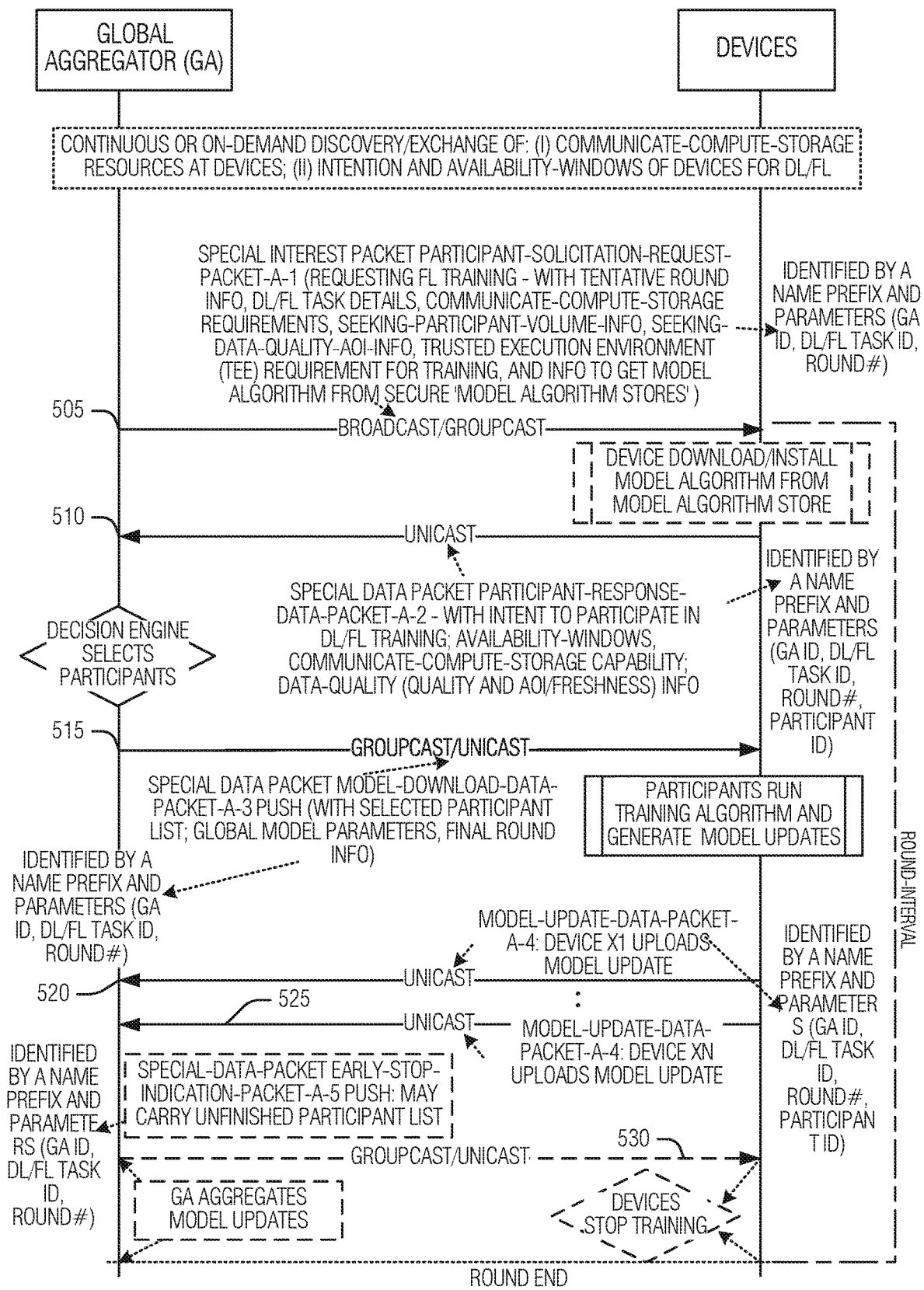
FIG. 5 illustrates an example message exchange for distributed machine learning without a local coordinator, according to an embodiment.

FIG. 5 illustrates an example message exchange for distributed machine learning without an LC, according to an embodiment. The illustrated flow represents an on-demand mechanism of information exchange or negotiation among the GA and potential participant devices.

The exchange starts with the GA transmitting a special ICN interest packet called Participant-Solicitation-Request-Packet-A-1 (message 505) to potential participant devices. This special interest packet is a recruitment to participate in the present DML Training. The Participant-Solicitation-Request-Packet-A-1 may include Tentative Round Information, a Communicate-Compute-Storage Requirement, a query for participant volume information—e.g., absolute number of participants seeking or volume levels such as High/Medium/Low), among other things. The Participant-Solicitation-Request-Packet-A-1 may also include Trusted Execution Environment (TEE) requirements for training, and information to access and retrieve a Model Algorithm to implement the training from a secure Model Algorithm Stores, or other data provider.

In an example, the Participant-Solicitation-Request-Packet-A-1 is broadcast (e.g., a wireless broadcast). Here, broadcast may be limited to potential geographic locations if, for example, the GA has information about the position of the potential participant devices.

In an example, the Participant-Solicitation-Request-Packet-A-1 may have one or more of the following features. The packet name may contain a name-Prefix such as/DML-Participant-Selection-Prefix/Request or/DML-Participant-Selection-Prefix, among others. The packet name may also include a round number, DML Task ID, GA ID, Seeking-Participant-Volume-Level (e.g., High/Medium/Low although this may alternatively be encoded as parameter in the packet rather than in the name). In an example, the packet name includes a selection end time, which may be useful for deciding PIT-Entry-A-1 Expiry time as described below.

Parameters of the Participant-Solicitation-Request-Packet-A-1 may include DML round Information (e.g., round Start Time, selection End Time, Round End Time, etc.), DML Task Details, Communicate-Compute-Storage Requirements, Seeking-Participant-Volume-Information, or Seeking Age of Information (AoI). In an example, the packet parameters include a TEE requirement for training. The TEE requirement defines TEE features of the participant device hardware that are necessary to participate in a DML round.

In an example, the packet includes parameters to access the module training algorithm from a secure store. In an example, the model training algorithm may be one of several acceptable model training algorithms. In an example, the parameters provide a recommendation for the model training algorithm over others based on, for example, a reputation score. In an example, a minimum reputation score for an acceptable model training algorithm is provided. Thus, here, the participant node may use any appropriate model training algorithm with a reputation score that meets or exceeds this parameter. A location or geo-area of the secure store holding the model training algorithm is provided in the parameters. In an example, the parameters may include information about a user community or evaluating entity, such as consumer protection agency or interest group, from which to obtain the reputation score in various geographic areas.

As the Participant-Solicitation-Request-Packet-A-1 packet traverses the ICN from the GA it will encounter forwarding nodes (e.g., ICN routers). These nodes may create a PIT entry, referred to here as PIT-Entry-A-1. Generally, each node forwarding the Participant-Response-Data-Packet-A-1 creates the PIT-Entry-A-1 entry. In an example, the PIT-Entry-A-1 has a name prefix based on the Participant-Solicitation-Request-Packet-A-1 name, such as '/DML-Participant-Selection-Prefix'. Further, the PIT-Entry-A-1 is recorded in the PIT with one or more of the DML round number, the DML Task ID, or the Aggregator ID. The PIT-Entry-A-1 facilitates forwarding potential upcoming Participant-Response-Data-Packet-A-2 messages towards the GA. In an example, the PIT-Entry-A-1 is removed based on a timer that expires at the End of Participant Selection or at the End of the Round (e.g., the Round End Time). The Round End Time timer-based removal of a PIT entry differs from standard ICN behavior in which the entry is removed upon receipt and forwarding of a data packet matching the name in the PIT. Thus, in an example, the PIT-Entry-A-1 is not be removed on forwarding a Participant-Response-Data-Packet-A-2 from a device as multiple devices may send Participant-Response-Data-Packet-A-2. The following table illustrates an example PIT-Entry-A-1 PIT entry:

| PIT-Entry-A-1 Example | | Meta-Data/Additional Information | |
|---|---|---|---|
| Prefix | Face(s) | Meta-Data | Expiry-Information |
| /DML-Participant-Selection-Prefix | Face: To Aggregator (L2) ID | Round#, DML Task ID, Aggregator ID, | Selection End Time |

Participant devices satisfying requirements specified in the Participant-Solicitation-Request-Packet-A-1 and willing to participate in the DML respond to Global Aggregator with special ICN data packet called Participant-Response-Data-Packet-A-2 (message 510). In an example, if the device intends to participate in the DML training and it does not have required model training algorithm already, it may obtain the model training algorithm as described below before indicating its intention to participate by sending the Participant-Response-Data-Packet-A-2 message. In an example, the Participant-Response-Data-Packet-A-2 is sent as a unicast message directed to the GA.

The Participant-Response-Data-Packet-A-2 carries a participant device's intent to help with the DML training; Availability-Windows; Communicate-Compute-Storage Capabilities; or Data-quality (e.g., quality and AoI) information. In an example, the packet name may include a name-prefix in accordance with the Participant-Solicitation-Request-Packet-A-1, such as '/DML-Participant-Selection-Prefix'. The name may also include one or more of the round number, DML Task ID, Aggregator ID, or Participant Node ID. The name may also include the round End Time to enable the PIT-Entry-A-2 to be removed after the Round End Time has elapse. This may help an intermediate forwarder (e.g., ICN router) to discard the packet after the Round End Time.

In an example, the response packets may also include device attestation evidence according to trustworthiness properties of the device. A device may employ a variety of attestation roots of trust including but not limited to a trusted platform module (TPM), a device identifier composition engine (DICE), software guard extensions (SGX), trusted domain extension (TDX), TrustZone, etc. In an example, the GC may act as an attestation verifier for provided attestation evidence. In an example, the GC may have security policies that require verification of attestation evidence as a pre-condition to acting on or forwarding other information contained in the message. In an example, the DML round context (e.g., the Round Start time or the Round End time) may include a session handle or context identifier that establishes the lifetime of the attestation result. Re-attestation may not be necessary while the session context is active and re-attestation may be necessary each time a round context is instantiated.

In an example, a cascaded attestation result may be established by the GC involving devices (e.g., ICN routers, forwarding nodes, participant devices, etc.) with which it interacts and the other devices with which those devices interact. In an example, a cascaded attestation context may include a device aggregating the attestation results from the other devices with which it communicates and to produce 'attestation result attestation'(ATA) evidence. In an example, a cascaded attestation context may include the device forwarding the various attestation results from each attested device allowing the GC to inspect the specific devices participating in the overall round. In an example, the attestation result information may be linked to data in the FIB or PIT structures as 'attestation metadata'. In an example, attestation results may be checked as a pre-condition to processing data.

The Participant-Response-Data-Packet-A-2 payload may include an intent to participate in DML Training. The payload may also include one or more of, Availability-Windows for the device, Communicate-Compute-Storage Capabilities of the device, or Data-quality information of the local data.

Nodes forwarding Participant-Response-Data-Packet-A-2 may create a PIT entry with a name related to the Participant-Response-Data-Packet-A-2, such as PIT-Entry-A-2. In an example, each node forwarding the Participant-Response-Data-Packet-A-2 creates a PIT-Entry-A-2. In an example, the PIT-Entry-A-2 has a name prefix related to the Participant-Response-Data-Packet-A-2 name, such as '/DML-Model-Download-Prefix'. In an example, the PIT-Entry-2 includes one or more of the DML round number, DML Task ID, Aggregator ID, or one or more device or participant IDs. Device IDs of all devices for which this device has forwarded Participant-Response-Data-Packet-A-2 may also be included in the PIT-Entry-2 because it is not yet known which participant devices have been selected by the LC or the GA.

The PIT-Entry-A-2 facilitates forwarding potential upcoming Model-Download-Data-Packet-A-3 towards participating devices. As with the PIT-Entry-1, the PIT-Entry-A-2 may be removed based on the timer which expires at the end of the round. In an example, the name part of Participant-Response-Data-Packet-A-2 may include the Round End Time to enable the PIT-Entry-A-2 to be removed after Round End time. In an example, the PIT-Entry-A-2 may be removed after forwarding the Model-Download-Data-Packet-A-3 (mentioned below) from all devices in the PIT-Entry-A-2. The following is an example of the PIT-Entry-2:

| PIT-Entry-A-2 Example | | | Meta-Data/Additional Information |
|---|---|---|---|
| Prefix | Face(s) | Meta-Data | Expiry-Information |
| /DML-Model-Download-Prefix | Face: To Participant (L2) IDs | Round#, DML Task ID, Aggregator ID, Participant Node IDs | Round End Time |

In an example, the ICN router (e.g., intermediate forwarder) may aggregate Participant-Response-Data-Packet-A-2 from multiple devices to generate an Aggregated-Participant-Response-Data-Packet-A-2 before sending the data on towards the GA. In an example, the name of the Aggregated-Participant-Response-Data-Packet-A-2 includes one or more of the round number, DML Task ID, Aggregator ID, multiple Participant Node IDs, or Selection End Time. In an example, the content of the Aggregated-Participant-Response-Data-Packet-A-2 includes the contents from multiple individual Participant-Response-Data-Packet-A-2 received from participant devices. In an example, the ICN router adds Participant IDs of associated all devices in a meta-data field of the PIT-Entry-A-2 PIT entry.

The Model-Download-Data-Packet-A-3 is used to signal selection of the participant devices by the GA (message 515). In an example, the Model-Download-Data-Packet-A-3 is sent by GA to each selected participant as unicast message. The Model-Download-Data-Packet-A-3 name includes a name prefix related to the DML round, such as '/DML-Model-Download-Prefix'. The Model-Download-Data-Packet-A-3 name also includes the participant node ID. In an example, the Model-Download-Data-Packet-A-3 name includes one or more of the round number, DML Task ID, or Global Aggregator ID. In an example, the Model-Download-Data-Packet-A-3 name includes the Round End Time. The round end time may not be useful when the GA ends a round without waiting to get availability windows from the devices. However, in some cases, the GA may send only tentative round information in the Participant-Solicitation-Request-Packet-A-1. In that case, after getting feedback about availability windows from the devices, the GA may establish an exact round time and 'Round End Time' then may be used in the name.

The Model-Download-Data-Packet-A-3 payload may include one or more of Global Model Parameters; Round Information (e.g., Exact timing); or Selected Participant list, this list may be optional and is generally not useful in a unicast message. However, it may be helpful if the Model-Download-Data-Packet-A-3 is broadcast to multiple participant devices.

The Model-Download-Data-Packet-A-3 may be used to create PIT-Entry-A-3 for potential upcoming Model-Update-Data-Packet-A-4 (e.g., Model Updates) or Early-Stop-Indication-Packet-A-5. In receiving ICN routers. The following is an example of the PIT-Entry-A-3:

| PIT-Entry-A-3 Example | | | Meta-Data/Additional Information |
|---|---|---|---|
| Prefix | Face(s) | Meta-Data | Expiry-Information |
| /DML-Model-Update-Prefix | Face: To Aggregator (L2) ID | Round#, DML Task ID, Aggregator ID, Participant Node IDs | Round End Time |
| /DML-Early-Stop-Indication-Prefix | Face: to Participant (L2) IDs | Round#, DML Task ID, Aggregator ID, Participant Node IDs | |

After model training on local data at the participant devices, the devices transmit model updates to the GA via a Model-Update-Data-Packet-A-4 ICN data packet (messages 520 and 525). In an example, the Model-Update-Data-Packet-A-4 is sent by each participant to Global Aggregator as unicast message. The Model-Update-Data-Packet-A-4 name may include, as with the other packets noted above, a name prefix such as '/DML-Model-Update-Prefix'. The name may also include the round number, DML Task ID, Aggregator ID, and the Participant Node ID, as well as the Round End Time. The Model-Update-Data-Packet-A-4 payload may include a Model Update Report which details changes to the model between the model prior to training at the device and the model after training at the device. In an example, the Model-Update-Data-Packet-A-4 payload may include intention or availability-windows for future participation. This may be in response to the GA including information about more than one planned DML round in Participant-Solicitation-Request-Packet-A-1.

In an example, the GA may get model updates from a sufficient number of participants ahead of End of the Round. In this case, the GA may push a special ICN Notification packet, Early-Stop-Indication-Packet-A-5 (message 530), to the participants (e.g., from in the Selection List) which are yet to upload model updates. The Early-Stop-Indication-Packet-A-5 name may include name prefix, such as '/DML-Early-Stop-Indication-Prefix', the round number, DML Task ID, Aggregator ID, or Early-Stop-Indication Flag. In an example, the name may include a Selected Unfinished Participant list. If the list is small, it may be included in the name because it may assist ICN routers to forward the Early-Stop-Indication-Packet-A-5 only towards the unfinished participants and enables the ICN routers to clear the PIT-Entry-A-3. In an example, the Early-Stop-Indication-Packet-A-5 payload may contain the Selected Unfinished Participant list. Once the Early-Stop-Indication-Packet-A-5 is received, a device in Unfinished Participant list halts the model training, saving resources that will not be used.

In an example, the GA may proactively seek DML participant device information by periodically broadcasting a DML Task list with capability or resource requirements and potential Round time schedules. To accomplish this, the GA may transmit a Periodic-DML-Participant-Solicitation-Request-Packet-P-1. In an example, the Periodic-DML-Participant-Solicitation-Request-Packet-P-1 may carry TEE requirements for training or information to obtain the model training algorithms. In an example, ICN routers may establish a non-expiring PIT entry, PIT-Entry-P-0, to receive and forward the Periodic-DML-Participant-Solicitation-Request-Packet-P-1. Upon reception of Periodic-DML-Participant-Solicitation-Request-Packet-P-1, ICN routers may create the PIT-Entry-P-1, similar to PIT-Entry-A-1 described above, to forward the Periodic-DML-Participant-Response-Data-Packet-P-2 from itself or potential other participants to the GA.

In an example, if a device intends to participate in the DML training and it does not have required the model training algorithm, the device may acquire the model training algorithm before indicating its intention to participate in the DML to GA—for example, before sending the Periodic-DML-Participant-Response-Data-Packet-P-2. Devices that satisfying requirements specified by the GA in the Periodic-DML-Participant-Solicitation-Request-Packet-P-1 may send a Periodic-DML-Participant-Response-Data-Packet-P-2 in response to the Periodic-DML-Participant-Solicitation-Request-Packet-P-1. The Periodic-DML-Participant-Response-Data-Packet-P-2 contains Communicate-Compute-Storage capabilities of devices along with Intention and Availability-Windows of devices for DML participation and age of data information. In an example, nodes may create a PIT-Entry-P-2 (similar to PIT-Entry-A-2 described above) upon reception of the Periodic-DML-Participant-Response-Data-Packet-P-2 to forward the model download packet to its own DML application as well as to other participant devices.

The GA may use the periodically collected information to select a Participant list. Once the Participant list is created, remaining procedure may be same as described above. That is, the GA sends Model parameters to selected participants for the Round, Participants training the model, and send model updates to the GA.

Figure 6:
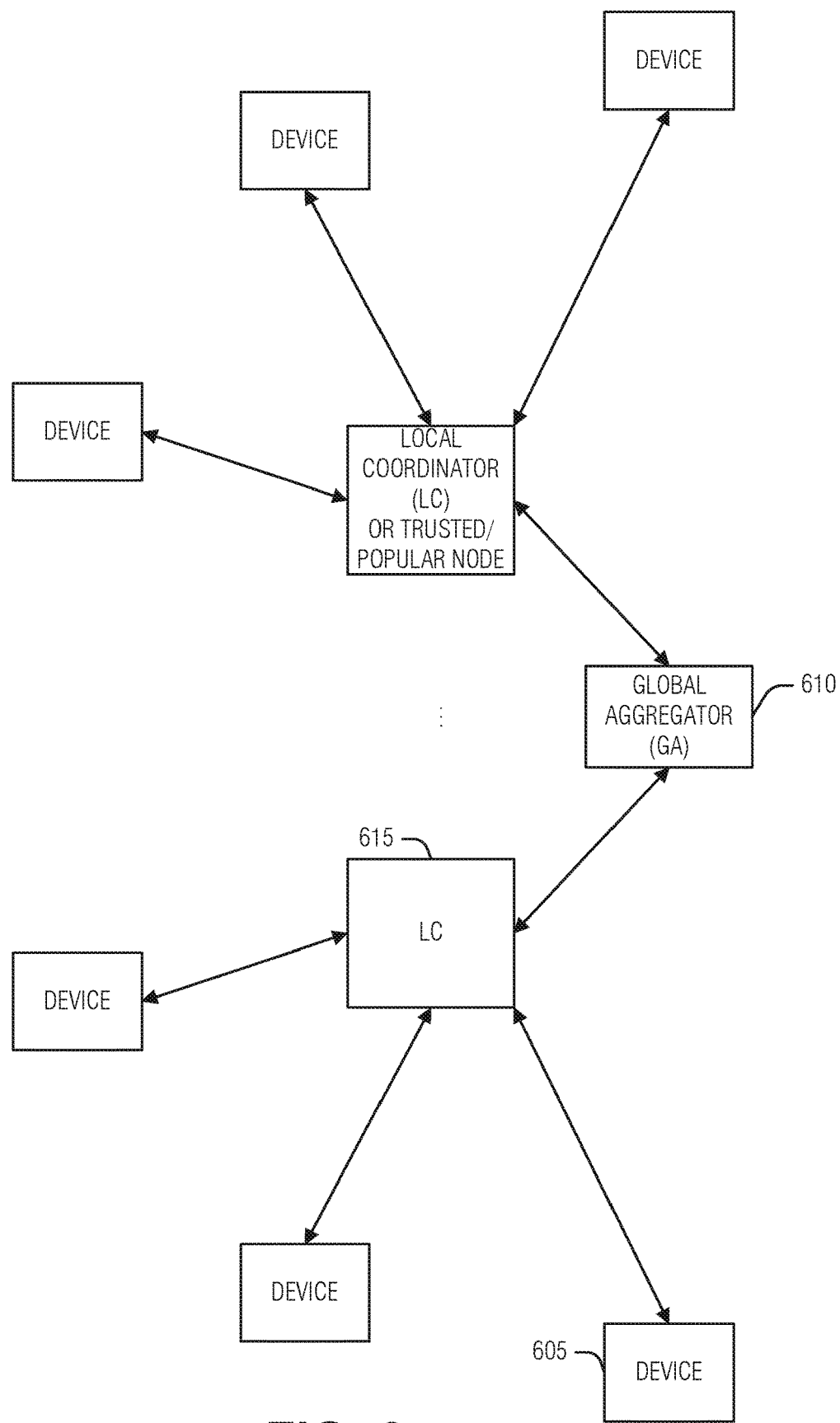
FIG. 6 illustrates an architecture for distributed machine learning with a local coordinator, according to an embodiment.

FIG. 6 illustrates an architecture for distributed machine learning with an LC 615, according to an embodiment. In contrast to the architecture illustrates in FIG. 4, this high-level architecture includes LCs 615 to assist the GA 610 communicate with devices (e.g., device 605).

Figure 7:
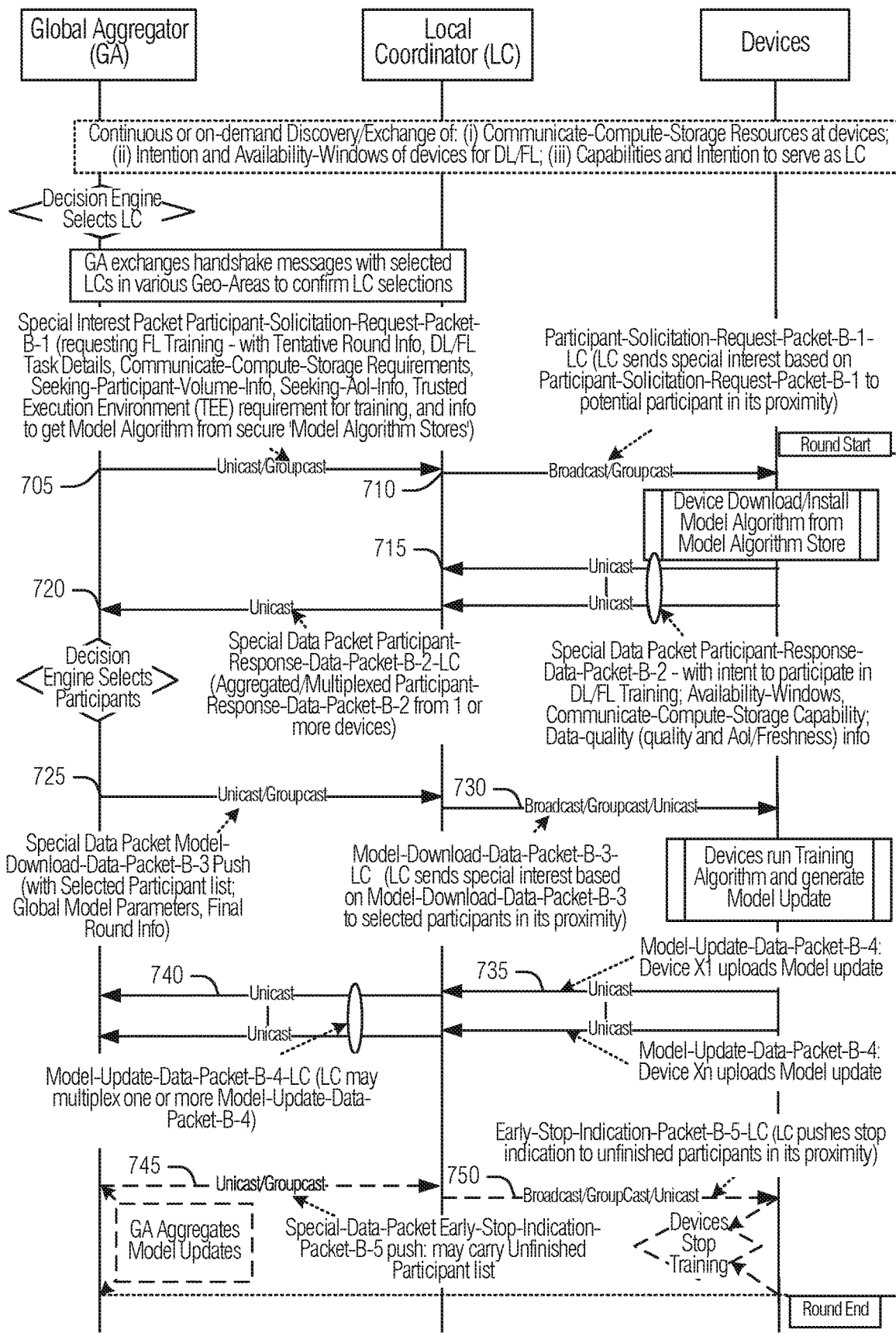
FIG. 7 illustrates an example message exchange for distributed machine learning with a local coordinator, according to an embodiment.
Figure 8:
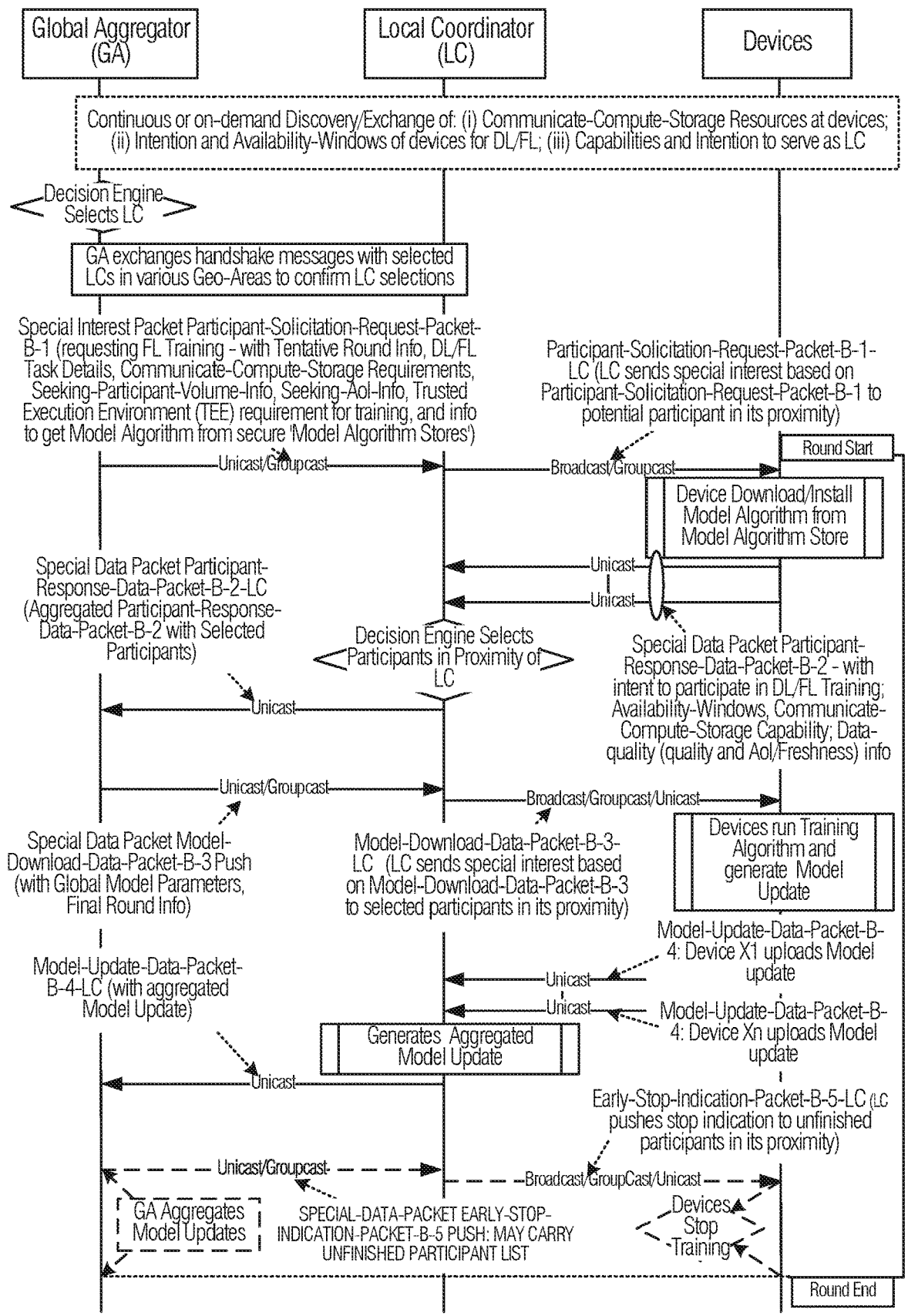
FIG. 8 illustrates an example message exchange for distributed machine learning with a local coordinator and local model aggregation, according to an embodiment.

FIGS. 7 and 8 illustrate an examples of message exchanges between the GA, the LC, and participant devices. FIG. 7 illustrates the LC only mediating the message exchanges between the GA and the participant device, while FIG. 8 illustrates the LC coordinating communication potential participant devices in proximity to the LC as well as performing selected DML related operations such as local aggregation or local participant selection. The elements of these exchanges may be similar to that described above with respect to FIGS. 4 and 5, with the LC ID added in most of the message naming and possibly in some of the PIT table entries.

FIG. 7 illustrates an example message exchange for distributed machine learning with a local coordinator, according to an embodiment. FIG. 6 Message Exchanges for DML when there are local coordinators to coordinate Communication with potential participants in proximity of LCs.

This interaction may begin when the GA sends a Participant-Solicitation-Request-Packet-B-1 (message 705) interest packet to the LC (e.g., as a unicast message). The Participant-Solicitation-Request-Packet-B-1 may include one or more of Tentative Round Information, DML Task Details, Communicate-Compute-Storage Requirements, a query for participant volume information—e.g., absolute number of participants seeking or volume levels such as High/Medium/Low to be selected per LC, a query for data quality and age of Information, Model-Update-Size-Threshold-for-Local-Aggregation, Participants-Selection-by-LC-Flag, among other things. In an example, the Participant-Solicitation-Request-Packet-B-1 may include a TEE requirement for training, or information to access a model training algorithm, for example, from secure a 'Model Algorithm Store' or another provider.

In response to receiving the Participant-Solicitation-Request-Packet-B-1, the LC may generate a Participant-Solicitation-Request-Packet-B-1-LC (message 710) interest packet based on the Participant-Solicitation-Request-Packet-B-1. The LC may then send the Participant-Solicitation-Request-Packet-B-1-LC to potential participant nodes in proximity to the LC (e.g., as a broadcast message). Here proximity may include network proximity (e.g., nodes within one, two, or some other defined number of hops from the LC) or geographic proximity (e.g., within a certain radius of the LC, within a city of the LC, etc.).

The Participant-Solicitation-Request-Packet-B-1-LC may include a subset of the Participant-Solicitation-Request-Packet-B-1 data. For Example, the Participant-Solicitation-Request-Packet-B-1-LC may include one of more of the Tentative Round Information, DML Task Details, Communicate-Compute-Storage Requirements, query for Participant-Volume-Information, query for data quality, AoI, TEE requirement for training, or information to access the model training algorithm. Thus, the Participant-Solicitation-Request-Packet-B-1-LC may be thought of as a local version of Participant-Solicitation-Request-Packet-B-1, where locality is defined by the LC.

Interested participant nodes-which may be limited to those that satisfy the requirements specified by the GA-respond with a Participant-Response-Data-Packet-B-2 data packet to the LC (message(s) 715). The Participant-Response-Data-Packet-B-2 identifies the node's intent to participate in the DML training (e.g., a current DML training round). The Participant-Response-Data-Packet-B-2 may include one or more of Availability-Windows for the node, Communicate-Compute-Storage Capabilities of the node; or Data-quality of the node's data that will be used to training the model. In an example, if the device intends to participate in the DML round and does not have the model training algorithm, the device may retrieve the model training algorithm prior to sending the Participant-Response-Data-Packet-B-2.

In an example, the response packets may also include device attestation evidence according to trustworthiness properties of the device. A device may employ a variety of attestation roots of trust including but not limited to a trusted platform module (TPM), a device identifier composition engine (DICE), software guard extensions (SGX), trusted domain extension (TDX), TrustZone, etc. In an example, the LC or the GC may act as attestation verifiers for provided attestation evidence. In an example, the LC or the GC may have security policies that require verification of attestation evidence as a pre-condition to acting on or forwarding other information contained in the message. In an example, the DML round context (e.g., the Round Start time or the Round End time) may include a session handle or context identifier that establishes the lifetime of the attestation result. Re-attestation may not be necessary while the session context is active and re-attestation may be necessary each time a round context is instantiated.

In an example, a cascaded attestation result may be established by the GC involving the LCs with which it interacts and the devices with which each LC interacts. In an example, a cascaded attestation context may include the LC aggregating the attestation results from the devices with which it communicates and to produce an 'attestation result attestation'(ATA) evidence. In an example, a cascaded attestation context may include the LC forwarding the various attestation results from each attested device allowing the GC to inspect the specific devices participating in the overall round. In an example, the attestation result information may be linked to data in the FIB or PIT structures as 'attestation metadata'. In an example, attestation results may be checked as a pre-condition to processing data.

In an example, if a Participants-Selection-by-LC-Flag, or the like, is not set in the Participant-Solicitation-Request-Packet-B-1, the LC may send a list of responding devices (e.g., interested participant devices) that includes the reported information of those device to the GA, for example, via a Participant-Response-Data-Packet-B-2-LC data packet (message 720). In this case, the GA may select the participant devices from this list. In an example, the GA may use similar technique for participant selection as described below with respect to QoS aware participant selection.

In an example, if the Participants-Selection-by-LC-Flag is set, the LC selects which of the responding devices will be participating devices in, for example, this round of the DML. As noted above, these responding devices may be limited to proximate devices. In an example, the LC may employ the QoS aware participant selection described later. Once the participant device selection is made by the LC, the LC may send a list with the selected participants, and the corresponding information of these devices, to the GA via the Participant-Response-Data-Packet-B-2-LC data packet.

After participant devices are selected, the GA may send a Model-Download-Data-Packet-B-3 (message 725) data packet for this round of DML to each LC. In an example, the Model-Download-Data-Packet-B-3 is unicast to the LCs. In an example, the Model-Download-Data-Packet-B-3 includes a selected participant list if, for example, the participants are selected by the GA or if the GA has overridden one or more of an LC's participant device selections.

In response to receiving the Model-Download-Data-Packet-B-3, the LC may send a Model-Download-Data-Packet-B-3-LC (message 730) data packet to the selected participant devices. The LC may transmit the Model-Download-Data-Packet-B-3-LC as broadcast (e.g., if several participants are selected) or unicast (e.g., if only one or two participants selected from this LC) message.

At this stage, the participant devices perform model training in accordance with the DML training round criteria (e.g., using the specified model training algorithm over a specified set of data, etc.) to produce an update for the model. The devices may then transmit the produce model update to the LC in a Model-Update-Data-Packet-B-4 data packet (message 735). In an example, the Model-Update-Data-Packet-B-4 data packet is a unicast message to the LC.

In an example, if a Model-Update-Size-Threshold-for-Local-Aggregation value is provided to LC from the GA, the LC may aggregate the model updates from participant nodes when multiple model updates are received. In an example, the LC has a time window in which model updates received during the window are aggregated in order to prevent delay from a later reporting participant node, for example. In an example, the LC performs the aggregation as described below with respect to local aggregation of model updates by the LC. Once the aggregated model update is produced, the LC transmits a Model-Update-Data-Packet-B-4-LC (message 740) data packet to the GA. This Model-Update-Data-Packet-B-4-LC includes the aggregated model update. In an example, the Model-Update-Data-Packet-B-4-LC is a unicast message.

In an example, if a Model-Update-Size-Threshold-for-Local-Aggregation value is not provided to the LC, the LC forwards the model update of each participant to the GA in a Model-Update-Data-Packet-B-4-LC data packet. The model updates from the participant devices may be multiplexed in a single Model-Update-Data-Packet-B-4-LC data packet.

The GA, upon receipt of model updates, aggregates the model updates. This aggregation may address noise issues introduced by the local data of the participant devices. The aggregated update may then be applied to the global model. This updated global model may then be distributed to nodes for inference operations at those nodes.

In an example, the GA may receive sufficient model updates to produce a good update to the global model before receiving all model updates from the participant nodes. The sufficiency of the model updates may be a training parameter set by designers, and the sufficiency of a subset of expected model updates may be due to over-enrollment of participant devices to address such things as device failure. In any case, when the GA has received a sufficient model updates (which may be judged by number or quality or extent of the training contained within the received updates), the GA may send an Early-Stop-Indication-Packet-B-5 (message 745) ICN notification packet to participating LCs. The Early-Stop-Indication-Packet-B-5 may include an unfinished participant(s) list. In an example, the Early-Stop-Indication-Packet-B-5 is a unicast message.

When an LC receives the Early-Stop-Indication-Packet-B-5, the LC sends an Early-Stop-Indication-Packet-B-5-LC (message 750) to the unfinished participant devices specified in the Early-Stop-Indication-Packet-B-5. The Early-Stop-Indication-Packet-B-5-LC is may be transmitted as a broadcast or unicast message, for example, depending on how large the list is (e.g., over or under a threshold). After receiving the Early-Stop-Indication-Packet-B-5-LC, a participant device ceases its model training efforts.

FIG. 8 illustrates an example message exchange for distributed machine learning with a local coordinator and local model aggregation, according to an embodiment. The illustrated flow largely tracks that described above with respect to FIG. 7, however, the LCs aggregate model updates locally. This may be termed local aggregation of model updates by LC. If the model update reports from participant devices are large (as defined by network or DML designers), network communication may be difficult. Specifically, as the size or number of model updates increases, the network generally will be bandwidth constrained, slowing the flow of updates to the GA. To address this concern, LCs may aggregate model updates from participant devices that report to an LC. This aggregation may operate similar to hierarchical FL.

The GA may control whether an LC should engage in local aggregation via a threshold value specified as Model-Update-Size-Threshold-for-Local-Aggregation. This value is generally communicated at the beginning of a DML training round. In an example, the Model-Update-Size-Threshold-for-Local-Aggregation value is included as a parameter in one or both of the Model-Download-Data-Packet-B-3 or the Participant-Solicitation-Request-Packet-B-1. In an example, the Model-Update-Size-Threshold-for-Local-Aggregation value may be provided to the LCs during LC discovery. In an example, the Model-Update-Size-Threshold-for-Local-Aggregation includes a time frame over which it is valid, or may remain valid until an update to the value is received from the GA. The Model-Update-Size-Threshold-for-Local-Aggregation may have a special value to indicate that it does not reply. In an example, the Model-Update-Size-Threshold-for-Local-Aggregation value may be specified for a DML training task (e.g., a unit of work that is part of a DML training round) or for a geographic area.

After receiving model updates from participant devices over which the LC is responsible, the LC may compare the model update sizes with the Model-Update-Size-Threshold-for-Local-Aggregation value. If a given model update size, or a collection of model update sizes held by the LC, exceed the Model-Update-Size-Threshold-for-Local-Aggregation, the LC aggregates the model updates to generate an aggregated model update. This may be included in a report that is transmitted to the GA. In an example, the LC aggregates all collected model updates at the end of a round. If the end of the round is called time $t_1$, which may be expressed as $t_1$=Round End-$t_{LC\text{-}GA\text{-}CommunicationTime}$, in which the Round End subtracts the time for communication latency between the GA and the LC and a margin 'CommunicationTime'.

In an example, the LC aggregates collected model updates every $T_{LocalAgePeriod}$ interval after the model training parameters have been communicated to the participant devices. In an example, $T_{LocalAgePeriod}$ may be sub-integer multiples of $t_2$, where $t_2$=Round End−Time, as defined in the model training parameters sent to the participating devices. In an example, each aggregated model update may be sent to the GA separately, when they are generated by the LC.

Another aspect of the process may include employing a QoS aware participant selection. Here, it may be assumed that the LC possess information about the participant devices over which it is responsible. This information may include such things as Training Data Quality, Training Data Size, AoI, Compute-Storage Capability, or Availability Windows. The LC may maintain this data via updates pushed from the devices or via a periodical discovery broadcast or directed query of the devices. In an example, LCs may send the participant device information to the GA. It may also be assumed that expected training time for a given participant device is inversely proportional to the Compute-Storage Capability of the participant device and that the expected training time is proportionally related to the Training Data Size held by the participant device.

Given these assumptions, QoS aware participant selection may proceed as follows. The GA selects $N_{TotalPerLC}$ and $P_{ReportMinPerc}$ values for a given round. $N_{TotalPerLC}$ is a total of the expected participant device selection in proximity of an LC. $N_{TotalPerLC}$ may vary between LCs.

As before, the GA transmits DML training round information-such as Round Start Time, Round duration, Participant Selection Duration, etc.—along with $N_{TotalPerLC}$ and $P_{ReportMinPerc}$ to the LC during the participant device selection phase. Thus, this information may be transmitted in the Participant-Solicitation-Request-Packet-B-1 message described above.

To implement the group QoS participant selection technique, the LC prepares a first list, $L_1$, of devices with an availability window that overlaps the round interval. In an example, the LC selects $N_1 = P_{ReportMinPerc} + Del_{QoSMargin}$ percent of $N_{TotalPerLC}$. To accomplished this selection, the LC may prepare a second list, $L_2$, of devices in descending order of $p_1$ values, $$p_1 = a_1 * NormalizedComputeStorageCapability +$$
$$a_2 * \left[\frac{1}{TrainingDataSize}\right]_{normalized} +$$

$$a_3 * NormalizedTrainingDataQuality +$$
$$a_4 * NormalizedAgeOfInformation, \text{ where } a_1 > a_2 > (a_3, a_4).$$

$Del_{QoSMargin}$ is a value that provides an extra margin to ensure that the QoS is over the potential communication loss during participant device to LC and LC to GA message exchanges. In an example, $Del_{QoSMargin} \in [0, 100 - P_{ReportMinPerc}]$.

From $L_2$, the LC may select the first $N_1$ participant devices with the largest corresponding $p_1$ values. The LC may proceed by selecting $N_2 = N_{TotalPerLC} - N_1$ by preparing a third list, $L_3$, of all devices that have not yet been selected, and prepares a fourth list, $L_4$, of devices in descending order of $p_2$ values. Here, $p_2$ is calculated as $$p_2 = b_1 * NormalizedTrainingDataQuality +$$
$$b_2 * NormalizedAgeOfInformation +$$
$$b_3 * NormalizedComputeStorageCapability +$$
$$b_4 * \left[\frac{1}{TrainingDataSize}\right]_{normalized}, \text{ where } b1 > b2 > b3 > b4.$$

The LC may then select the first $N_2$ devices with the largest $p_2$ values as participants from the list $L_4$.

It is possible that, after getting responses of intent to participate in a DML round from interested participant devices, the GA determines that there are insufficient devices to perform the DML round as planned. In an example, this insufficiency of the interested devices may be due to a lack of overlap between the availability windows of known devices and the DML training round. In this case, the GA adjust times for initiating a variety of the training phases, such as distributing the model configuration or when model updates are expected to be completed. In an example, the GA may move the training phases in time to increase the quality of participating devices, where quality may include a better quality, better AoI, or better compute capabilities.

In an example, the GA may adjust training by including only tentative round information in the Participant-Solicitation-Request-Packet-B-1. Here, the LC may share information about the interested participants-such as Availability-Windows, Communicate-Compute-Storage Capability, Data-quality, AoI/Freshness information, etc. gathered from Participant-Response-Data-Packet-B-2 for example—to the GA via the Participant-Response-Data-Packet-B-2-LC message. In an example, the LC may share this information about interested participant devices even when local participant selection by LC is enabled because some LCs may be able to select sufficient qualified participant devices given current round timing.

In an example, if the GA moves the training phases, the GA may select a new start for the shifted phases to accommodate the participant device selection to fill the desired numbers or quality of devices. In an example, the GA may forego setting new start times for phases and extend the Round End time when training phases do not need to be synchronized. In an example, the End of Round time is synchronized to ensure accurate aggregation of model updates by the GA. In an example, the GA may include updated round information in the Model-Download-Data-Packet-B-3 to inform the LC about modification in round timing. In turn, the LC may provide this information to selected participants via the Model-Download-Data-Packet-B-3-LC message. In an example, ICN routers may record these changes in PIT metadata and expiration timers for these packets to facilitate distribution of the information without the need for retransmission of the same data over the same network hops.

Figure 9:
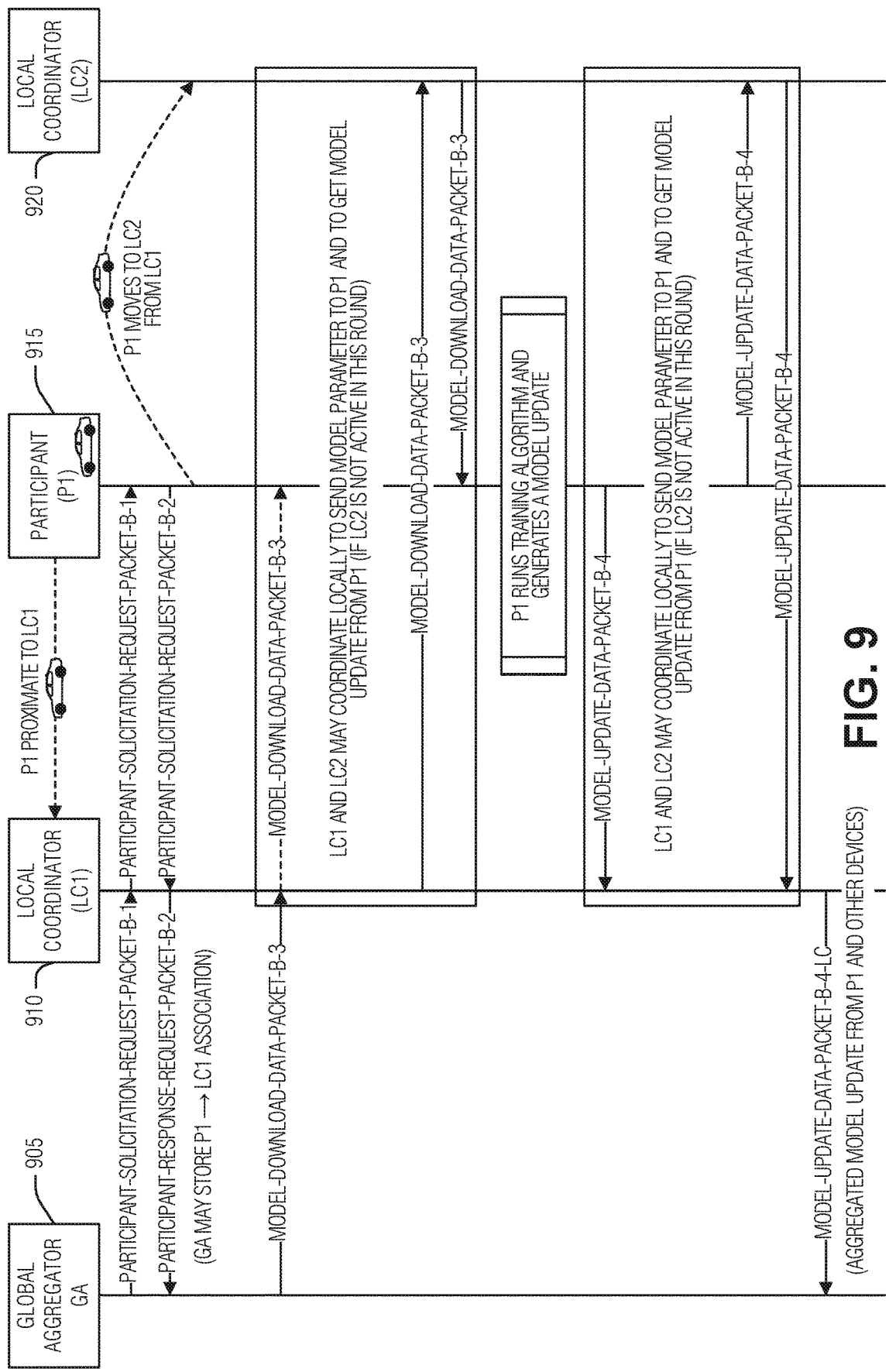
FIGS. 9-11 illustrate examples of message exchanges when a participant node moves connectivity from a first local coordinator to a second local coordinator, according to an embodiment.
Figure 10:
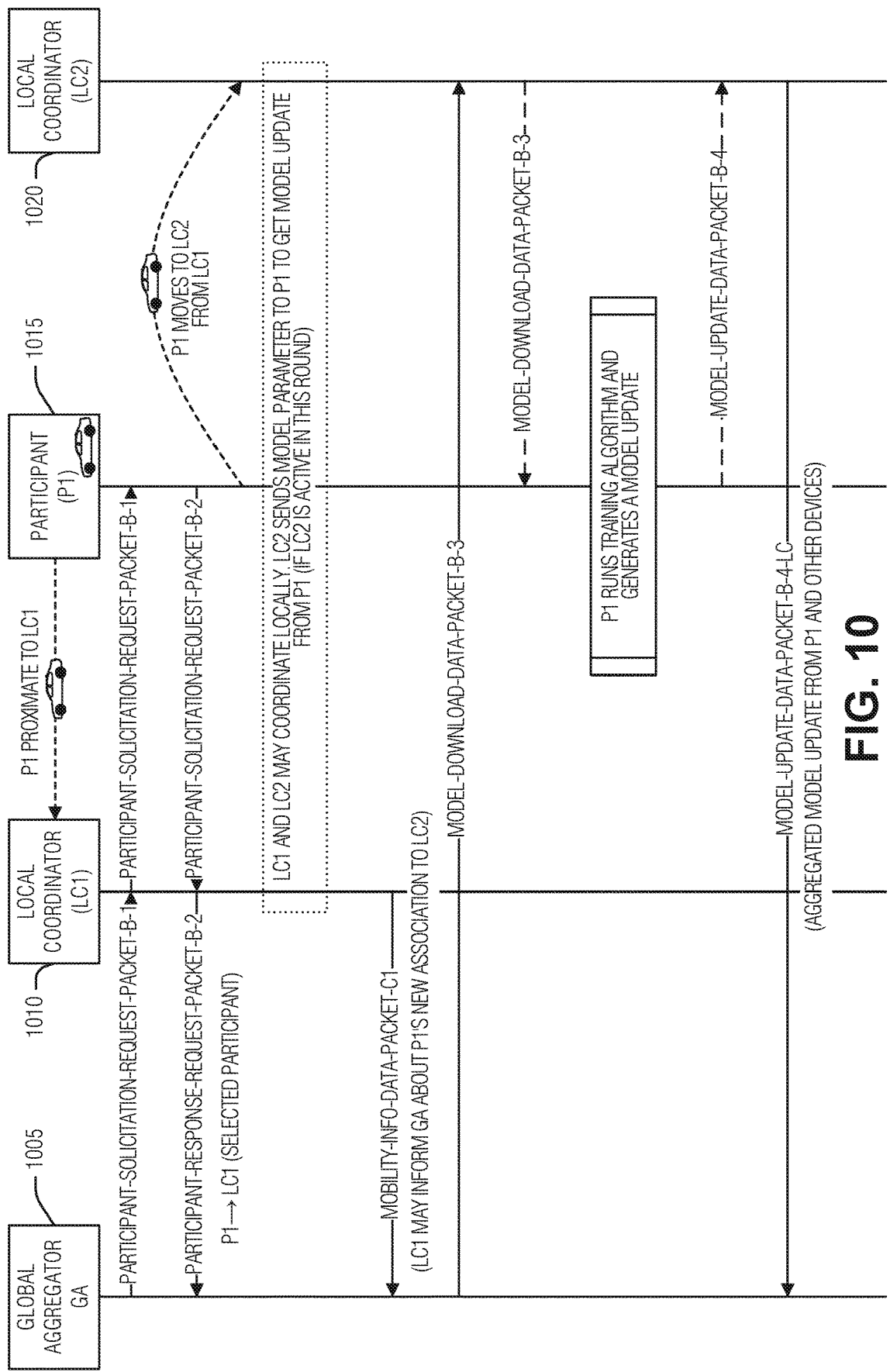
Figure 11:
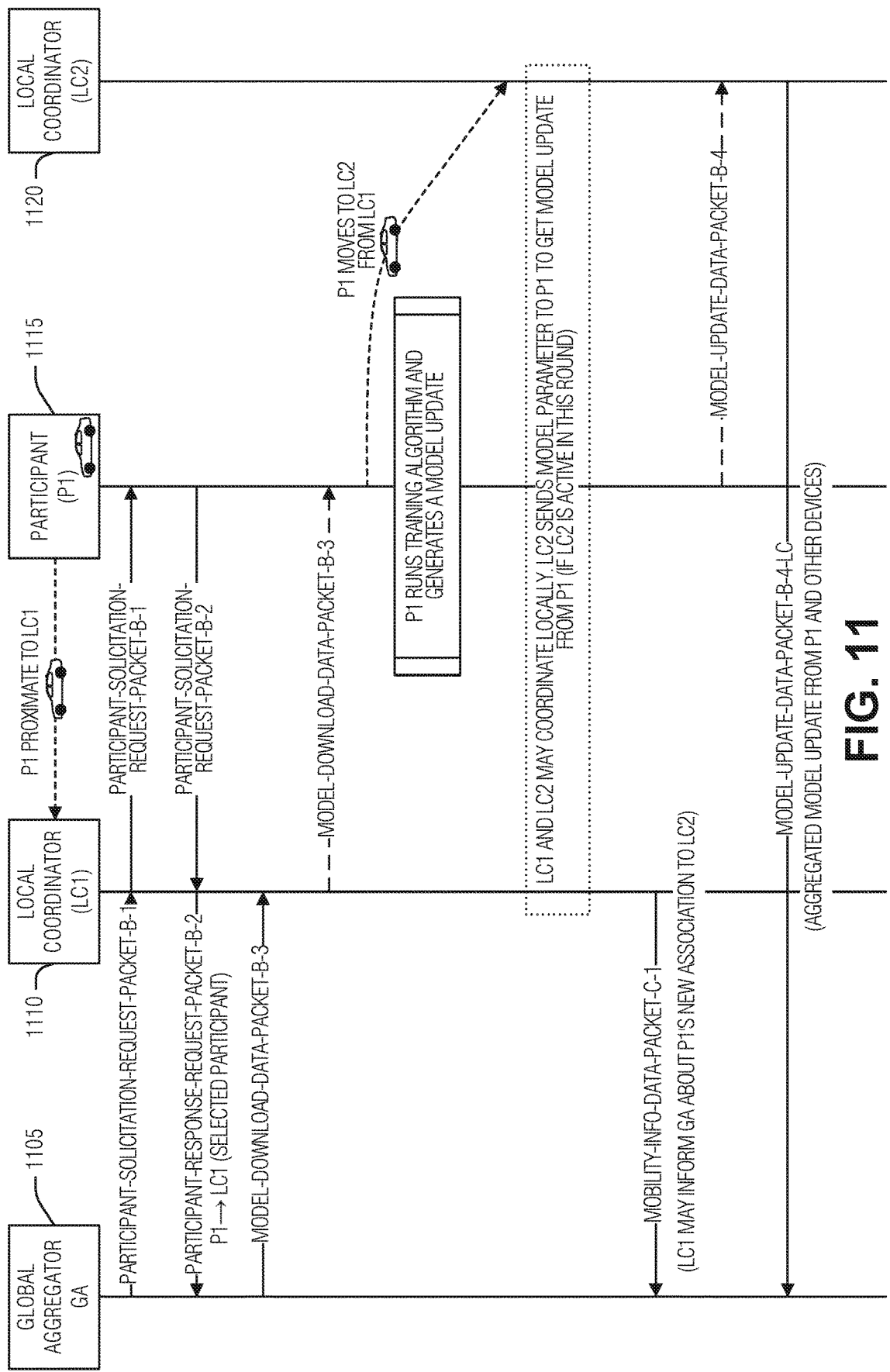

FIGS. 9-11 illustrate examples of message exchanges when a participant node moves connectivity from a first local coordinator to a second local coordinator, according to an embodiment. These illustrations cover different scenarios in which a participant device's mobility may impact its participation in a DML round. For example, FIG. 9 illustrates a situation in which the participant device moves from one LC to another after it is selected to participate in a round of training, but before it acquires the model training instructions from the first LC. FIG. 10 illustrates much the same situation in a case where the GA communicates the model training instructions directly to the participant device. Here, the LCs coordinate on receiving the forthcoming model update from the device. FIG. 11 illustrates a situation in which the participant device moves from a first LC to a second LC while it is performing the model training.

In FIG. 9, as noted above, participant device P1 915 moves from LC1 910 to LC2 920 after sending the Participant-Response-Data-Packet-B-2. Here, LC2 920 is not participating in the current DML training round. Accordingly, LC1 910 may still be the conduit for P1 915 to the GA 905. In this case, LC1 910 may coordinate with LC2 920 to complete the exchange, such as by sending the Model-Download-Data-Packet-B-3 from the GA 905 to P1 915 via LC2 920 or forwarding the Model-Update-Data-Packet-B-4 from P1 915 to the GA 905 via LC2 920).

FIG. 10 is another case where P1 1015 moves from LC1 1010 to LC2 1020 after sending the Participant-Response-Data-Packet-B-2 to the GA 1005 via LC1 1010. Here, LC2 1020 is participating in current DML training round. Accordingly, LC1 1010 may handover its responsibilities regarding the message exchange to LC2 1020 and LC2 1020 completes the changes. The handover from LC1 1010 to LC 2 1020 may include transmission of P1 1015 information, or other context information pertaining to the training round, to LC2 1020. After the handover, LC 1010 may transmit a Mobility-Information-Data-Packet-C-1 message to the GA 1005 to indicate that P1 1015 has moved to LC2 1020. This may be useful for future message exchanges, such as the GA 1005 sending the Model-Download-Data-Packet-B-3 to P1 1015 via LC2 1020 and expecting the Model-Update-Data-Packet-B-4 from P1 1015 to be muted through LC2 1020.

In FIG. 11, P1 1115 moves from LC1 1110 to LC2 1120 after receiving the Model-Download-Data-Packet-B-3 from the GA 1105 via LC1 1110. Here, LC2 1120 is participating in current round, so LC2 1120 may complete rest of the message exchange with P1 1115. LC1 1110 coordinates with LC2 1120 to handover P1 1115. LC1 1110 may then send the Mobility-Information-Data-Packet-C-1 to the GA 1105.

Safety and security concerns may be present regarding the participant devices. Generally, the training involved in machine learning operates on data and telemetry that observes subject behavior. Such observations may be privacy sensitive as it may reveal behaviors, preferences, activities that when associated with the participant reveals unintended knowledge about the subject. Privacy sensitivity may also be described in terms of intellectual property, algorithms, or methods that, if revealed, would allow others free access to the valuable model or process to create the model. Therefore, the training data should be protected from unauthorized disclosure. Authorized disclosure may involve operation that aggregate and filter the data to obfuscate or remove portions that otherwise make compromise individual privacy. The process of training a model may produce a result that isn't privacy sensitive given privacy sensitive input data or may legitimately produce a model that implicates the user's privacy (e.g., a biometric model of the user to infer the effects of sleep on the user's feelings). The distinguishing factor for privacy is determined by the objectives and goal of training. If the goal reinforces observations that are not privacy sensitive, then the model produced probably isn't going to violate the user's privacy. Consequently, the model training algorithm determines whether or not the trained model will be privacy sensitive.

In an example, reputation metadata associated with the model training algorithms may be used as a rating system. This rating system may be employed by users, owners, or operators of the participant devices to choose how sensitive to privacy the user is, and thus which algorithms are permitted for use in a DML training for that device. Users may consult reputation statistics-such as a reputation score from 1-10—that is maintained by a user community or other evaluation entity-such as consumer protection agency or interest group. In an example, the user may install the training model algorithm into a TEE-such as Intel SGX, Intel CSME, ARM TrustZone, a Kubernetes container, or other trustworthy environment such as a platform containing a trusted boot sequence and TPM or a DICE root of trust that maintains a known good firmware configuration and attestation key. The TEE may collect the data set used for the training. This pipeline is usually trusted because the user controls the data stream into the TEE and trusts that the model code is not able to exfiltrate raw data to unauthorized entities. In an example, training is applied using the TEE under user control. The user is generally trusted not to provide false input data and the TEE is trusted by the GA agent to not disclose the model training algorithm or to reverse-engineer the model training algorithm.

Upon training completion, the model update information is released to the LC and processed as described above. The model doesn't reveal privacy sensitive information beyond that indicated by the privacy reputation score. The TEE may delete the model training algorithm or otherwise keep it hidden within the TEE or allow it to be updated by the GA, the LC, or other entity authorized to manage the DML system.

In an example, the TEE may authenticate the model training algorithm, or application to run the model training algorithm, before it is permitted to load into the TEE. In an example, the TEE may verify the privacy reputation score against a participant's allowable scores. In an example, the LC, GA, participant device, or other node in the ICN may request attestation of the loaded training algorithm or code using an attestation capability implemented by the TEE. For example, an Intel SGX attestation system may report a hash of the training code memory pages or it may report the vendor, product ID, version and security version (SVN) associated with the model training algorithm. Attestation may also include the reputation score value. Report verifiers may use attestation to re-verify that the loaded or installed training module meets expected privacy objectives. In an example, the LC or the GA may register a cryptographic key with the TEE that is used to encrypt the model data prior to releasing it outside of the TEE. In an example, the model training code may be encrypted using the registered key that the TEE uses to decrypt prior to execution. In an example, for TEEs that support encrypted code execution, the model training code may remain encrypted during execution within the TEE.

To compliment the security features noted above, a Secure Model Algorithm Store may be employed to provide access to a variety of model training algorithms. In an example, a number of trusted nodes in the ICN may serve as 'Model Algorithm Stores', which may be distributed in various geographic areas. In an example, such a store includes reputation metadata associated with each model training algorithm. In an example, an aggregated reputation score may be maintained and associated to each store as well. In an example, any given reputation score may be learned or calculated over time and maintained by a user community or evaluating entity.

In an example, the GA may collect information about the various Model Algorithm Stores. This information may include such things as location or reputation score. These stores may maintain an inventory or model training algorithms in coordination with the GA. In an example, LCs may serve as Model Algorithm Stores. In an example, the GA may give higher priority to select Model Algorithm Stores.

In an example, the GA may directly inform participant nodes or LCs about store selection parameters. Such parameters may include which model training algorithm should be used during a round of DML, a listing of stores and associated reputation score, among other criteria. In an example, Recommendations may be made for stores based on the model training algorithm selected (e.g., different stores for different algorithms). In an example, the recommendations may be made based on past participants recommendations, geographic location of stores, or information about user community or evaluating entity, etc.

After receiving Secure Model Algorithm Store information from the GA, if a participant device intends to participate in a DML round and the participant device does not have an appropriate model training algorithm, the participant device accesses a store. In an example, this is complete before the device indicates its intention to participate to GA.

Accessing the store may include, if the GA has not provided recommended Model Algorithm Stores that is in proximity to the device and has reputation scores acceptable to a user of the device, the device may select a Secure Model Algorithm Stores based on its reputation score for the interested model algorithm and expected communication cost (e.g., lower number of hops). For example, the participant device may sort candidate stores according to their reputation scores and query them one by one to download the desired model training algorithm. This may include querying all the candidate stores to find the model training algorithm with the highest reputation score (e.g., greater than Minimum Reputation score Requirement to download specified by the GA) within a specified proximity, where proximity is defined in terms of network hops. In an example, the search may include stopping the query once the device finds a model training algorithm which has reputation score greater than Minimum Reputation score Requirement to download as specified by the GA.

Once an appropriate store is found, the participant device may download the model training algorithm from the selected store. As noted above, this model training algorithm may then be installed onto the device, such as in a TEE. Again, the TEE may authenticate the model training algorithm, or other associated software, before the algorithm is permitted to load into the TEE.

Figure 12:
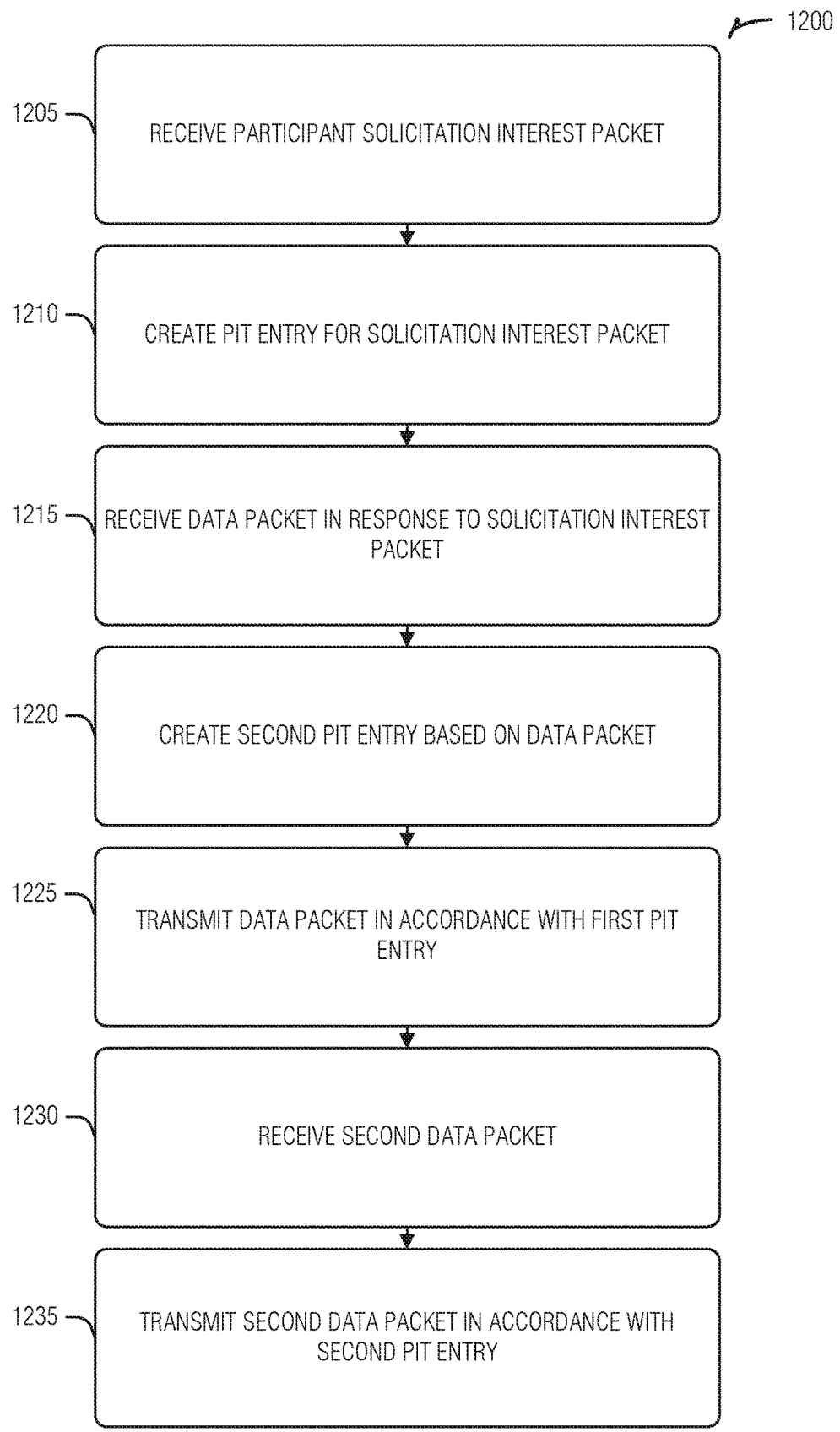
FIG. 12 is an example of a method for distributed machine learning in an information centric network, according to an embodiment.

FIG. 12 is an example of a method 1200 for distributed machine learning in an information centric network, according to an embodiment. The operations of the method are performed with computing hardware, such as that described above or below (e.g., processing circuitry of an ICN router).

At operation 1205, a participant solicitation interest packet is received. Here, the solicitation interest packet includes a name that identifies the solicitation interest packet as a DML participant solicitation and a set of parameters to participate in a round of DML. In an example, the name of the interest packet includes a DML round identification (ID) for the round of DML. In an example, the name includes a DML task ID. In an example, the interest packet name includes an aggregator ID.

In an example, the set of parameters include security requirements. In an example, the security requirements specify hardware, such as a TEE, in which data must be stored, or in which a model training algorithm must be stored or executed. In an example, the security requirements specify a type or level of encryption to apply to the data used for DML training, the model training algorithm, or produced model updates.

At operation 1210, a first PIT entry for the participant solicitation interest packet is created. In an example, the PIT entry is maintained until the expiration of a timer. In an example, the duration of the timer is specified in the solicitation interest packet.

At operation 1215, a first data packet is received in response to the solicitation interest packet from a downstream node. Here, the response indicates that the downstream node will participate in the round of DML specified by the solicitation interest packet. In an example, the first data packet has name that adds a participant ID to the name of the first interest packet.

At operation 1220, a second PIT entry is created for the first data packet in response to receiving the data packet. In an example, the second PIT entry corresponds to the first PIT entry.

At operation 1225, the first data packet is transmitted in accordance with the first PIT entry.

At operation 1230, a second data packet is received in response to the first data packet. Here, the second data packet identifies a DML model for the downstream node. In an example, the identification of the DML is the model training algorithm to be implemented by the downstream node in the round of DML.

In an example, receiving the second data packet includes creating a third PIT entry for the second data packet. Here, the third PIT entry corresponds to the first PIT entry and the second PIT entry. In an example, the method 1200 may extended to include receiving a third data packet that is a model update packet, and transmitting a representation of the third data packet in accordance to the third PIT entry. In an example, the representation of the third data packet is at least one of the third data packet or an aggregation of the data of the third data packet with other data packets from other downstream nodes.

At operation 1235, the second data packet is transmitted in accordance with the second PIT entry.

Figure 13:
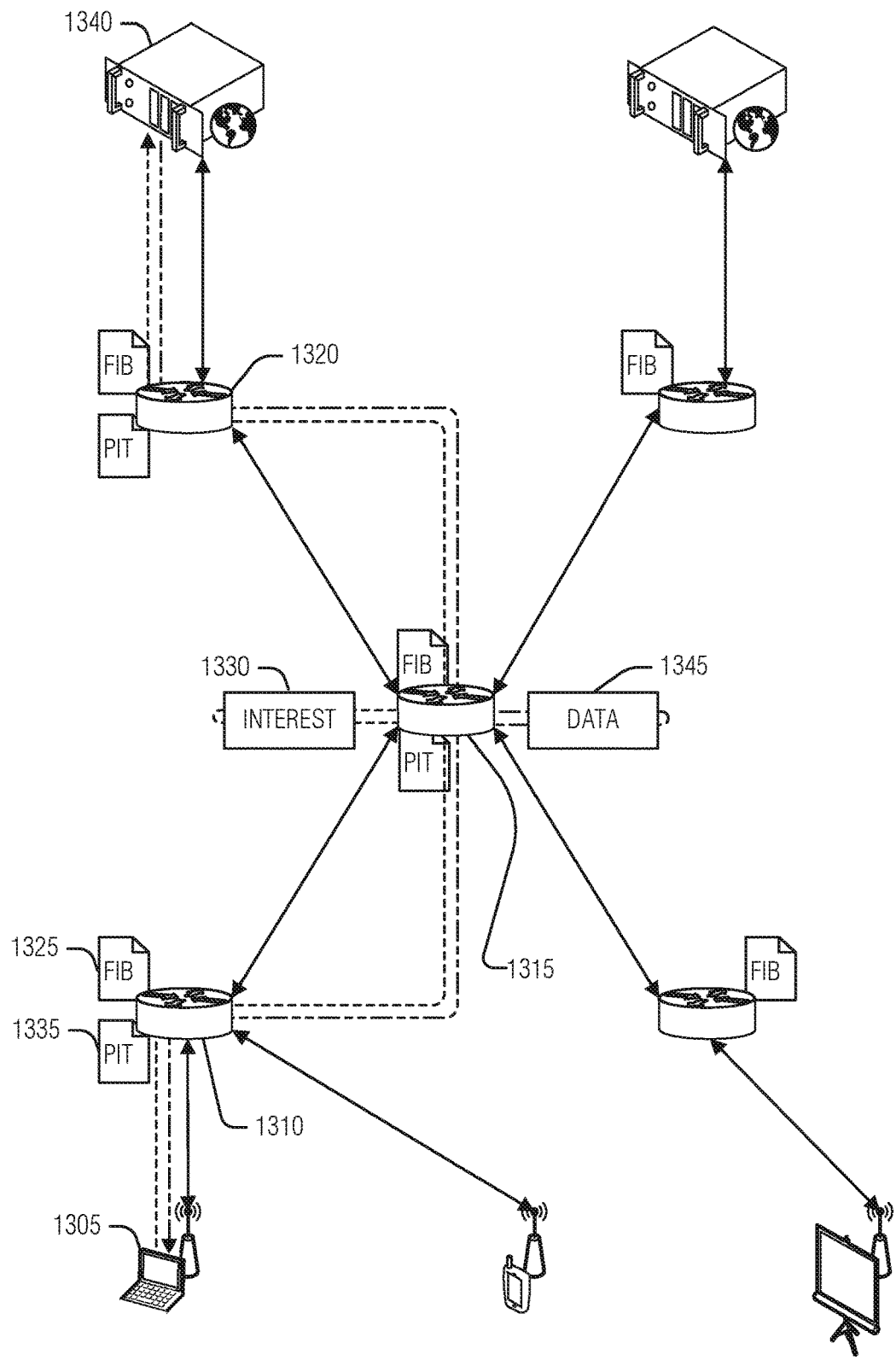
FIG. 13 illustrates an example ICN, according to an embodiment.
Figure 14:
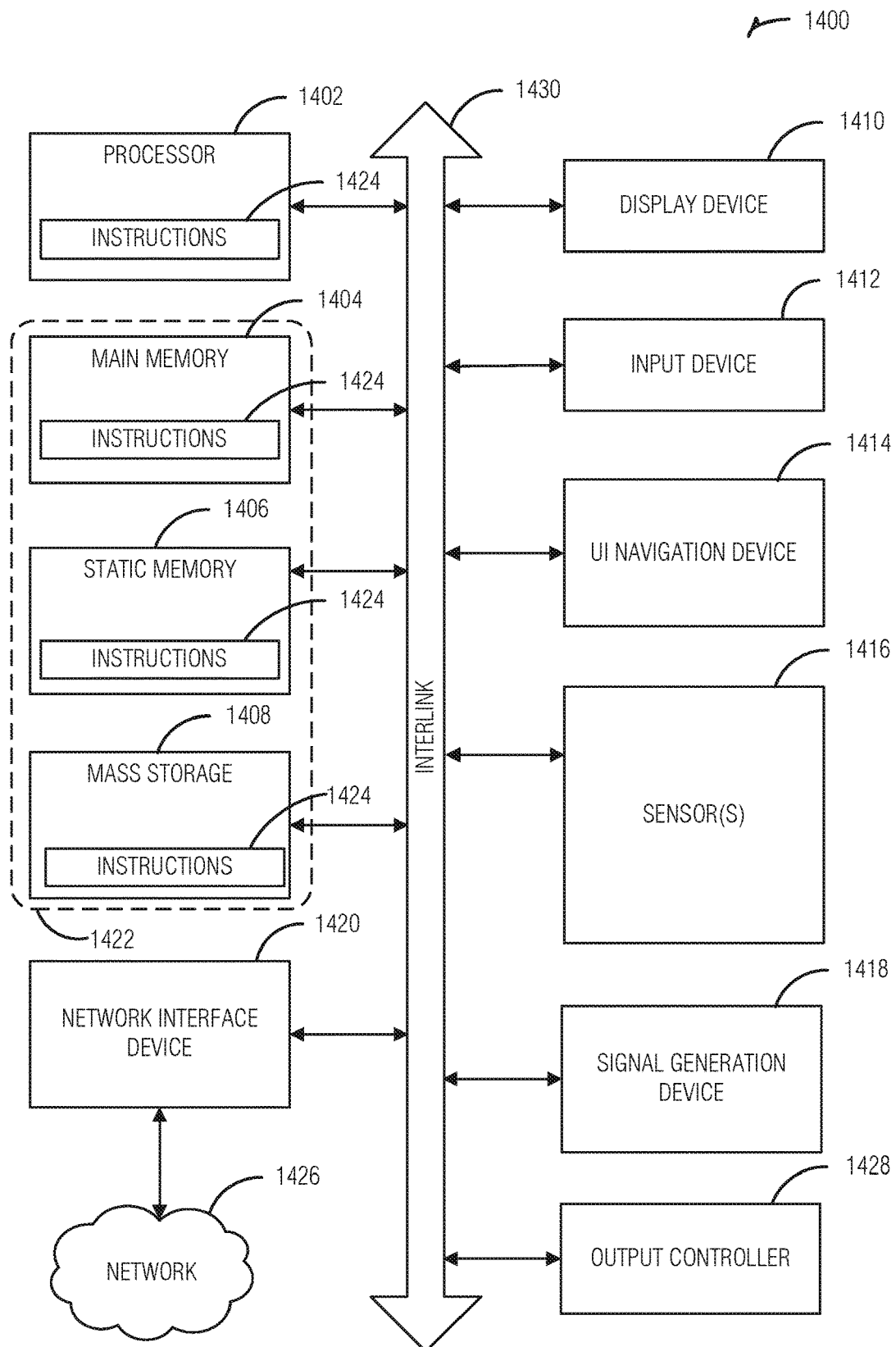
FIG. 14 is a block diagram illustrating an example of a machine upon which one or more embodiments may be implemented.

FIGS. 13 and 14 below provide additional details of the components in FIG. 1. For example, FIG. 13 illustrates several details and variations in ICNs. FIG. 14 illustrates several examples of computer hardware that may be used to implement any of the components illustrated in FIG. 1.

FIG. 13 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1305 (e.g., subscriber) requests named content from the network itself. The content request may be called an interest and transmitted via an interest packet 1330. As the interest packet traverses network devices (e.g., network elements, routers, switches, hubs, etc.)—such as network elements 1310, 1315, and 1320-a record of the interest is kept, for example, in a pending interest table (PIT) at each network element. Thus, network element 1310 maintains an entry in its PIT 1335 for the interest packet 1330, network element 1315 maintains the entry in its PIT, and network element 1320 maintains the entry in its PIT.

When a device, such as publisher 1340, that has content matching the name in the interest packet 1330 is encountered, that device 1340 may send a data packet 1345 in response to the interest packet 1330. Typically, the data packet 1345 is tracked back through the network to the source (e.g., device 1305) by following the traces of the interest packet 1330 left in the network element PITs. Thus, the PIT 1335 at each network element establishes a trail back to the subscriber 1305 for the data packet 1345 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1330 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 1330 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 1330 to data cached in the ICN element. Thus, for example, if the data 1345 named in the interest 1330 is cached in network element 1315, then the network element 1315 will return the data 1345 to the subscriber 1305 via the network element 1310. However, if the data 1345 is not cached at network element 1315, the network element 1315 routes the interest 1330 on (e.g., to network element 1320). To facilitate routing, the network elements may use a forwarding information base 1325 (FIB) to match named data to an interface (e.g., physical port) for the route. Thus, the FIB 1325 operates much like a routing table on a traditional network device.

In an example, additional meta-data may be attached to the interest packet 1330, the cached data, or the route (e.g., in the FIB 1325), to provide an additional level of matching. For example, the data name may be specified as "www.somedomain.com or videos or v8675309," but also include a version number—or timestamp, time range, endorsement, etc. In this example, the interest packet 1330 may specify the desired name, the version number, or the version range. The matching may then locate routes or cached data matching the name and perform the additional comparison of meta-data or the like to arrive at an ultimate decision as to whether data or a route matches the interest packet 1330 for respectively responding to the interest packet 1330 with the data packet 1345 or forwarding the interest packet 1330.

ICN has advantages over host-based networking because the data segments are individually named. This enables aggressive caching throughout the network as a network element may provide a data packet 1330 in response to an interest 1330 as easily as an original author 1340. Accordingly, it is less likely that the same segment of the network will transmit duplicates of the same data requested by different devices.

Fine grained encryption is another feature of many ICN networks. A typical data packet 1345 includes a name for the data that matches the name in the interest packet 1330. Further, the data packet 1345 includes the requested data and may include additional information to filter similarly named data (e.g., by creation time, expiration time, version, etc.). To address malicious entities providing false information under the same name, the data packet 1345 may also encrypt its contents with a publisher key or provide a cryptographic hash of the data and the name. Thus, knowing the key (e.g., from a certificate of an expected publisher 1340) enables the recipient to ascertain whether the data is from that publisher 1340. This technique also facilitates the aggressive caching of the data packets 1345 throughout the network because each data packet 1345 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

FIG. 14 illustrates a block diagram of an example machine 1400 upon which any one or more of the techniques (e.g., methodologies) discussed herein may perform. Examples, as described herein, may include, or may operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1400 follow.

In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1400 may include a hardware processor 1402 (e.g., a central processing unit (CPU), a graphics processing unit (GPU), a hardware processor core, or any combination thereof), a main memory 1404, a static memory (e.g., memory or storage for firmware, microcode, a basic-input-output (BIOS), unified extensible firmware interface (UEFI), etc.) 1406, and mass storage 1408 (e.g., hard drive, tape drive, flash storage, or other block devices) some or all of which may communicate with each other via an interlink (e.g., bus) 1430. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1408, a signal generation device 1418 (e.g., a speaker), a network interface device 1420, and one or more sensors 1416, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1402, the main memory 1404, the static memory 1406, or the mass storage 1408 may be, or include, a machine readable medium 1422 on which is stored one or more sets of data structures or instructions 1424 (e.g., software) embodying or utilized by any one or more of the techniques or functions described herein. The instructions 1424 may also reside, completely or at least partially, within any of registers of the processor 1402, the main memory 1404, the static memory 1406, or the mass storage 1408 during execution thereof by the machine 1400. In an example, one or any combination of the hardware processor 1402, the main memory 1404, the static memory 1406, or the mass storage 1408 may constitute the machine readable media 1422. While the machine readable medium 1422 is illustrated as a single medium, the term "machine readable medium" may include a single medium or multiple media (e.g., a centralized or distributed database, and/or associated caches and servers) configured to store the one or more instructions 1424.

In an example, information stored or otherwise provided on the machine-readable medium 1422 may be representative of the instructions 1424, such as instructions 1424 themselves or a format from which the instructions 1424 may be derived. This format from which the instructions 1424 may be derived may include source code, encoded instructions (e.g., in compressed or encrypted form), packaged instructions (e.g., split into multiple packages), or the like. The information representative of the instructions 1424 in the machine-readable medium 1422 may be processed by processing circuitry into the instructions 1424 to implement any of the operations discussed herein. For example, deriving the instructions 1424 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1424.

In an example, the derivation of the instructions 1424 may include assembly, compilation, or interpretation of the information (e.g., by the processing circuitry) to create the instructions 1424 from some intermediate or preprocessed format provided by the machine-readable medium 1422. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

ADDITIONAL NOTES & EXAMPLES

Example 1 is an information centric network (ICN) router for distributed machine learning protocol in an ICN, the ICN router comprising: a first network interface to connect to an upstream segment of the ICN; a second network interface to connect to a downstream segment of the ICN; and processing circuitry to: receive, at the first network interface, a participant solicitation interest packet, the solicitation interest packet including a name identifying the solicitation interest packet as a distributed machine learning (DML) participant solicitation and a set of parameters to participate in a round of DML; create a first pending interest table (PIT) entry for the participant solicitation interest packet, the PIT entry being maintained until the expiration of a timer, the duration of which is specified in the solicitation interest packet or derived from parameters of the solicitation interest packet; receive, at the second network interface, a first data packet in response to the solicitation interest packet from a downstream node, the response indicating that the downstream node will participate in the round of DML; creating a second PIT entry for the first data packet in response to receiving the data packet, the second PIT entry corresponding to the first PIT entry; transmit, on the first network interface, the first data packet in accordance with the first PIT entry; receive, at the first network interface, a second data packet in response to the first data packet, wherein the second data packet includes an identification of a DML model for the downstream node; and transmit, on the second network interface, the second data packet in accordance with the second PIT entry.

In Example 2, the subject matter of Example 1, wherein the identification of the DML model is an algorithm that the downstream node is to use to perform training in the round of DML.

In Example 3, the subject matter of Example 2, wherein, to receive the second data packet, the processing circuitry creates a third PIT entry for the second data packet, the third PIT entry corresponding to the first PIT entry and the second PIT entry.

In Example 4, the subject matter of Example 3, wherein the processing circuitry is configured to: receive, at the second network interface, a third data packet, the third data packet being a model update packet; and transmit, on the first network interface, a representation of the third data packet in accordance to the third PIT entry.

In Example 5, the subject matter of Example 4, wherein the representation of the third data packet is at least one of the third data packet or an aggregation of the data of the third data packet with other data packets from other downstream nodes.

In Example 6, the subject matter of any of Examples 1-5, wherein the interest packet includes a DML round identification (ID) for the round of DML, a DML task ID, and an aggregator ID.

In Example 7, the subject matter of Example 6, wherein a DML round identification (ID) for the round of DML, a DML task ID, and an aggregator ID are included in at least one of the name of the interest packet or in parameters of the interest packet.

In Example 8, the subject matter of Example 7, wherein the first data packet has name that adds a participant ID to the name of the first interest packet.

In Example 9, the subject matter of any of Examples 1-8, wherein the interest packet includes a DML round identification (ID) for the round of DML, a DML task ID, and an aggregator ID included in at least one of the name of the interest packet or in parameters of the interest packet.

In Example 10, the subject matter of any of Examples 1-9, wherein the set of parameters include security requirements, wherein the security requirements specify hardware for execution and encryption requirements for data processed as part of the round of DML.

In Example 11, the subject matter of any of Examples 1-10, wherein the solicitation interest packet is a unicast packet from a general aggregator (GA) to a local coordinator (LC), wherein the GA directs the DML and aggregates model updates into a global model, and wherein the LC interfaces with participant devices with at least one of a threshold number of network hops or a distance from the LC.

In Example 12, the subject matter of Example 11, wherein the LC aggregates model updates from participant devices for which it is responsible.

In Example 13, the subject matter of Example 12, wherein the LC is configured to hand-off participant device context during the round of DML to a second LC when the participant device moves into a coverage area of the second LC.

In Example 14, the subject matter of any of Examples 11-13, wherein the second data packet is sent in response to the participant device being selected to be part of the round of DML.

In Example 15, the subject matter of Example 14, wherein the participant device was below a minimum performance standard for an individual device to participate in the round of DML but was grouped with other participant devices that had a collective quality of service beyond a threshold, enabling the selection of the participant device for the round of DML.

Example 16 is a method for distributed machine learning protocol in an information centric network (ICN), the method comprising: receiving a participant solicitation interest packet, the solicitation interest packet including a name identifying the solicitation interest packet as a distributed machine learning (DML) participant solicitation and a set of parameters to participate in a round of DML; creating a first pending interest table (PIT) entry for the participant solicitation interest packet, the PIT entry being maintained until the expiration of a timer, the duration of which is specified in the solicitation interest packet or derived from parameters of the solicitation interest packet; receiving a first data packet in response to the solicitation interest packet from a downstream node, the response indicating that the downstream node will participate in the round of DML; creating a second PIT entry for the first data packet in response to receiving the data packet, the second PIT entry corresponding to the first PIT entry; transmitting the first data packet in accordance with the first PIT entry; receiving a second data packet in response to the first data packet, wherein the second data packet includes an identification of a DML model for the downstream node; and transmitting the second data packet in accordance with the second PIT entry.

In Example 17, the subject matter of Example 16, wherein the identification of the DML model is an algorithm that the downstream node is to use to perform training in the round of DML.

In Example 18, the subject matter of Example 17, wherein receiving the second data packet includes creating a third PIT entry for the second data packet, the third PIT entry corresponding to the first PIT entry and the second PIT entry.

In Example 19, the subject matter of Example 18, comprising: receiving a third data packet, the third data packet being a model update packet; and transmitting a representation of the third data packet in accordance to the third PIT entry.

In Example 20, the subject matter of Example 19, wherein the representation of the third data packet is at least one of the third data packet or an aggregation of the data of the third data packet with other data packets from other downstream nodes.

In Example 21, the subject matter of any of Examples 16-20, wherein the interest packet includes a DML round identification (ID) for the round of DML, a DML task ID, and an aggregator ID.

In Example 22, the subject matter of Example 21, wherein a DML round identification (ID) for the round of DML, a DML task ID, and an aggregator ID are included in at least one of the name of the interest packet or in parameters of the interest packet.

In Example 23, the subject matter of Example 22, wherein the first data packet has name that adds a participant ID to the name of the first interest packet.

In Example 24, the subject matter of any of Examples 16-23, wherein the interest packet includes a DML round identification (ID) for the round of DML, a DML task ID, and an aggregator ID included in at least one of the name of the interest packet or in parameters of the interest packet.

In Example 25, the subject matter of any of Examples 16-24, wherein the set of parameters include security requirements, wherein the security requirements specify hardware for execution and encryption requirements for data processed as part of the round of DML.

In Example 26, the subject matter of any of Examples 16-25, wherein the solicitation interest packet is a unicast packet from a general aggregator (GA) to a local coordinator (LC), wherein the GA directs the DML and aggregates model updates into a global model, and wherein the LC interfaces with participant devices with at least one of a threshold number of network hops or a distance from the LC.

In Example 27, the subject matter of Example 26, wherein the LC aggregates model updates from participant devices for which it is responsible.

In Example 28, the subject matter of Example 27, wherein the LC is configured to hand-off participant device context during the round of DML to a second LC when the participant device moves into a coverage area of the second LC.

In Example 29, the subject matter of any of Examples 26-28, wherein the second data packet is sent in response to the participant device being selected to be part of the round of DML.

In Example 30, the subject matter of Example 29, wherein the participant device was below a minimum performance standard for an individual device to participate in the round of DML but was grouped with other participant devices that had a collective quality of service beyond a threshold, enabling the selection of the participant device for the round of DML.

Example 31 is at least one machine-readable medium including instructions for distributed machine learning protocol in an information centric network (ICN), the instructions, when executed by processing circuitry, cause the processing circuitry to perform operations comprising: receiving a participant solicitation interest packet, the solicitation interest packet including a name identifying the solicitation interest packet as a distributed machine learning (DML) participant solicitation and a set of parameters to participate in a round of DML; creating a first pending interest table (PIT) entry for the participant solicitation interest packet, the PIT entry being maintained until the expiration of a timer, the duration of which is specified in the solicitation interest packet or derived from parameters of the solicitation interest packet; receiving a first data packet in response to the solicitation interest packet from a downstream node, the response indicating that the downstream node will participate in the round of DML; creating a second PIT entry for the first data packet in response to receiving the data packet, the second PIT entry corresponding to the first PIT entry; transmitting the first data packet in accordance with the first PIT entry; receiving a second data packet in response to the first data packet, wherein the second data packet includes an identification of a DML model for the downstream node; and transmitting the second data packet in accordance with the second PIT entry.

In Example 32, the subject matter of Example 31, wherein the identification of the DML model is an algorithm that the downstream node is to use to perform training in the round of DML.

In Example 33, the subject matter of Example 32, wherein receiving the second data packet includes creating a third PIT entry for the second data packet, the third PIT entry corresponding to the first PIT entry and the second PIT entry.

In Example 34, the subject matter of Example 33, wherein the operations comprise: receiving a third data packet, the third data packet being a model update packet; and transmitting a representation of the third data packet in accordance to the third PIT entry.

In Example 35, the subject matter of Example 34, wherein the representation of the third data packet is at least one of the third data packet or an aggregation of the data of the third data packet with other data packets from other downstream nodes.

In Example 36, the subject matter of any of Examples 31-35, wherein the interest packet includes a DML round identification (ID) for the round of DML, a DML task ID, and an aggregator ID.

In Example 37, the subject matter of Example 36, wherein a DML round identification (ID) for the round of DML, a DML task ID, and an aggregator ID are included in at least one of the name of the interest packet or in parameters of the interest packet.

In Example 38, the subject matter of Example 37, wherein the first data packet has name that adds a participant ID to the name of the first interest packet.

In Example 39, the subject matter of any of Examples 31-38, wherein the interest packet includes a DML round identification (ID) for the round of DML, a DML task ID, and an aggregator ID included in at least one of the name of the interest packet or in parameters of the interest packet.

In Example 40, the subject matter of any of Examples 31-39, wherein the set of parameters include security requirements, wherein the security requirements specify hardware for execution and encryption requirements for data processed as part of the round of DML.

In Example 41, the subject matter of any of Examples 31-40, wherein the solicitation interest packet is a unicast packet from a general aggregator (GA) to a local coordinator (LC), wherein the GA directs the DML and aggregates model updates into a global model, and wherein the LC interfaces with participant devices with at least one of a threshold number of network hops or a distance from the LC.

In Example 42, the subject matter of Example 41, wherein the LC aggregates model updates from participant devices for which it is responsible.

In Example 43, the subject matter of Example 42, wherein the LC is configured to hand-off participant device context during the round of DML to a second LC when the participant device moves into a coverage area of the second LC.

In Example 44, the subject matter of any of Examples 41-43, wherein the second data packet is sent in response to the participant device being selected to be part of the round of DML.

In Example 45, the subject matter of Example 44, wherein the participant device was below a minimum performance standard for an individual device to participate in the round of DML but was grouped with other participant devices that had a collective quality of service beyond a threshold, enabling the selection of the participant device for the round of DML.

Example 46 is a system for distributed machine learning protocol in an information centric network (ICN), the system comprising: means for receiving a participant solicitation interest packet, the solicitation interest packet including a name identifying the solicitation interest packet as a distributed machine learning (DML) participant solicitation and a set of parameters to participate in a round of DML; means for creating a first pending interest table (PIT) entry for the participant solicitation interest packet, the PIT entry being maintained until the expiration of a timer, the duration of which is specified in the solicitation interest packet or derived from parameters of the solicitation interest packet; means for receiving a first data packet in response to the solicitation interest packet from a downstream node, the response indicating that the downstream node will participate in the round of DML; means for creating a second PIT entry for the first data packet in response to receiving the data packet, the second PIT entry corresponding to the first PIT entry; means for transmitting the first data packet in accordance with the first PIT entry; means for receiving a second data packet in response to the first data packet, wherein the second data packet includes an identification of a DML model for the downstream node; and means for transmitting the second data packet in accordance with the second PIT entry.

In Example 47, the subject matter of Example 46, wherein the identification of the DML model is an algorithm that the downstream node is to use to perform training in the round of DML.

In Example 48, the subject matter of Example 47, wherein the means for receiving the second data packet include means for creating a third PIT entry for the second data packet, the third PIT entry corresponding to the first PIT entry and the second PIT entry.

In Example 49, the subject matter of Example 48, comprising: means for receiving a third data packet, the third data packet being a model update packet; and means for transmitting a representation of the third data packet in accordance to the third PIT entry.

In Example 50, the subject matter of Example 49, wherein the representation of the third data packet is at least one of the third data packet or an aggregation of the data of the third data packet with other data packets from other downstream nodes.

In Example 51, the subject matter of any of Examples 46-50, wherein the interest packet includes a DML round identification (ID) for the round of DML, a DML task ID, and an aggregator ID.

In Example 52, the subject matter of Example 51, wherein a DML round identification (ID) for the round of DML, a DML task ID, and an aggregator ID are included in at least one of the name of the interest packet or in parameters of the interest packet.

In Example 53, the subject matter of Example 52, wherein the first data packet has name that adds a participant ID to the name of the first interest packet.

In Example 54, the subject matter of any of Examples 46-53, wherein the interest packet includes a DML round identification (ID) for the round of DML, a DML task ID, and an aggregator ID included in at least one of the name of the interest packet or in parameters of the interest packet.

In Example 55, the subject matter of any of Examples 46-54, wherein the set of parameters include security requirements, wherein the security requirements specify hardware for execution and encryption requirements for data processed as part of the round of DML.

In Example 56, the subject matter of any of Examples 46-55, wherein the solicitation interest packet is a unicast packet from a general aggregator (GA) to a local coordinator (LC), wherein the GA directs the DML and aggregates model updates into a global model, and wherein the LC interfaces with participant devices with at least one of a threshold number of network hops or a distance from the LC.

In Example 57, the subject matter of Example 56, wherein the LC aggregates model updates from participant devices for which it is responsible.

In Example 58, the subject matter of Example 57, wherein the LC is configured to hand-off participant device context during the round of DML to a second LC when the participant device moves into a coverage area of the second LC.

In Example 59, the subject matter of any of Examples 56-58, wherein the second data packet is sent in response to the participant device being selected to be part of the round of DML.

In Example 60, the subject matter of Example 59, wherein the participant device was below a minimum performance standard for an individual device to participate in the round of DML but was grouped with other participant devices that had a collective quality of service beyond a threshold, enabling the selection of the participant device for the round of DML.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An information centric network (ICN) node for distributed machine learning protocol in an ICN, the ICN node comprising:
    a first network interface to connect to an upstream segment of the ICN;
    a second network interface to connect to a downstream segment of the ICN; and
    processing circuitry to:
        receive, at the first network interface, a participant solicitation interest packet, the solicitation interest packet including a name identifying the solicitation interest packet as a distributed machine learning (DML) participant solicitation and a set of parameters to participate in a round of DML;
        create a first pending interest table (PIT) entry for the participant solicitation interest packet, the PIT entry being maintained until the expiration of a timer, the duration of which is specified in the solicitation interest packet or derived from parameters of the solicitation interest packet;
        receive, at the second network interface, a first data packet in response to the solicitation interest packet from a downstream node, the response indicating that the downstream node will participate in the round of DML;
        create a second PIT entry for the first data packet in response to receiving the data packet, the second PIT entry corresponding to the first PIT entry;
        transmit, on the first network interface, the first data packet in accordance with the first PIT entry;
        receive, at the first network interface, a second data packet in response to the first data packet, wherein the second data packet includes an identification of a DML model for the downstream node; and
        transmit, on the second network interface, the second data packet in accordance with the second PIT entry.

2. The ICN node of claim 1, wherein the identification of the DML model is an algorithm that the downstream node is to use to perform training in the round of DML.

3. The ICN node of claim 2, wherein, to receive the second data packet, the processing circuitry creates a third PIT entry for the second data packet, the third PIT entry corresponding to the first PIT entry and the second PIT entry.

4. The ICN node of claim 3, wherein the processing circuitry is configured to:
    receive, at the second network interface, a third data packet, the third data packet being a model update packet; and
    transmit, on the first network interface, a representation of the third data packet in accordance to the third PIT entry.

5. The ICN node of claim 4, wherein the representation of the third data packet is at least one of the third data packet or an aggregation of the data of the third data packet with other data packets from other downstream nodes.

6. The ICN node of claim 1, wherein the interest packet includes a DML round identification (ID) for the round of DML, a DML task ID, and an aggregator ID included in at least one of the name of the interest packet or in parameters of the interest packet.

7. The ICN node of claim 1, wherein the set of parameters include security requirements, wherein the security requirements specify hardware for execution and encryption requirements for data processed as part of the round of DML.

8. The ICN node of claim 1, wherein the solicitation interest packet is a unicast packet from a general aggregator (GA) to a local coordinator (LC), wherein the GA directs the DML and aggregates model updates into a global model, and wherein the LC interfaces with participant devices with at least one of a threshold number of network hops or a distance from the LC.

9. A method for distributed machine learning protocol in an information centric network (ICN), the method comprising:
receiving a participant solicitation interest packet, the solicitation interest packet including a name identifying the solicitation interest packet as a distributed machine learning (DML) participant solicitation and a set of parameters to participate in a round of DML;
creating a first pending interest table (PIT) entry for the participant solicitation interest packet, the PIT entry being maintained until the expiration of a timer, the duration of which is specified in the solicitation interest packet or derived from parameters of the solicitation interest packet;
receiving a first data packet in response to the solicitation interest packet from a downstream node, the response indicating that the downstream node will participate in the round of DML;
creating a second PIT entry for the first data packet in response to receiving the data packet, the second PIT entry corresponding to the first PIT entry;
transmitting the first data packet in accordance with the first PIT entry;
receiving a second data packet in response to the first data packet, wherein the second data packet includes an identification of a DML model for the downstream node; and
transmitting the second data packet in accordance with the second PIT entry.

10. The method of claim 9, wherein the identification of the DML model is an algorithm that the downstream node is to use to perform training in the round of DML.

11. The method of claim 10, wherein receiving the second data packet includes creating a third PIT entry for the second data packet, the third PIT entry corresponding to the first PIT entry and the second PIT entry.

12. The method of claim 11, comprising:
receiving a third data packet, the third data packet being a model update packet; and
transmitting a representation of the third data packet in accordance to the third PIT entry.

13. The method of claim 12, wherein the representation of the third data packet is at least one of the third data packet or an aggregation of the data of the third data packet with other data packets from other downstream nodes.

14. The method of claim 9, wherein the interest packet includes a DML round identification (ID) for the round of DML, a DML task ID, and an aggregator ID included in at least one of the name of the interest packet or in parameters of the interest packet.

15. The method of claim 9, wherein the set of parameters include security requirements, wherein the security requirements specify hardware for execution and encryption requirements for data processed as part of the round of DML.

16. The method of claim 9, wherein the solicitation interest packet is a unicast packet from a general aggregator (GA) to a local coordinator (LC), wherein the GA directs the DML and aggregates model updates into a global model, and wherein the LC interfaces with participant devices with at least one of a threshold number of network hops or a distance from the LC.

17. At least one machine-readable medium including instructions for distributed machine learning protocol in an information centric network (ICN), the instructions, when executed by processing circuitry, cause the processing circuitry to perform operations comprising:
receiving a participant solicitation interest packet, the solicitation interest packet including a name identifying the solicitation interest packet as a distributed machine learning (DML) participant solicitation and a set of parameters to participate in a round of DML;
creating a first pending interest table (PIT) entry for the participant solicitation interest packet, the PIT entry being maintained until the expiration of a timer, the duration of which is specified in the solicitation interest packet or derived from parameters of the solicitation interest packet;
receiving a first data packet in response to the solicitation interest packet from a downstream node, the response indicating that the downstream node will participate in the round of DML;
creating a second PIT entry for the first data packet in response to receiving the data packet, the second PIT entry corresponding to the first PIT entry;
transmitting the first data packet in accordance with the first PIT entry;
receiving a second data packet in response to the first data packet, wherein the second data packet includes an identification of a DML model for the downstream node; and
transmitting the second data packet in accordance with the second PIT entry.

18. The at least one machine-readable medium of claim 17, wherein the identification of the DML model is an algorithm that the downstream node is to use to perform training in the round of DML.

19. The at least one machine-readable medium of claim 18, wherein receiving the second data packet includes creating a third PIT entry for the second data packet, the third PIT entry corresponding to the first PIT entry and the second PIT entry.

20. The at least one machine-readable medium of claim 19, wherein the operations comprise:
receiving a third data packet, the third data packet being a model update packet; and
transmitting a representation of the third data packet in accordance to the third PIT entry.

21. The at least one machine-readable medium of claim 20, wherein the representation of the third data packet is at least one of the third data packet or an aggregation of the data of the third data packet with other data packets from other downstream nodes.

22. The at least one machine-readable medium of claim 17, wherein the interest packet includes a DML round identification (ID) for the round of DML, a DML task ID, and an aggregator ID included in at least one of the name of the interest packet or in parameters of the interest packet.

23. The at least one machine-readable medium of claim 17, wherein the set of parameters include security requirements, wherein the security requirements specify hardware for execution and encryption requirements for data processed as part of the round of DML.

24. The at least one machine-readable medium of claim 17, wherein the solicitation interest packet is a unicast packet from a general aggregator (GA) to a local coordinator (LC), wherein the GA directs the DML and aggregates model updates into a global model, and wherein the LC interfaces with participant devices with at least one of a threshold number of network hops or a distance from the LC.

* * * * *